(12) United States Patent
Deuber et al.

(10) Patent No.: US 12,114,808 B2
(45) Date of Patent: *Oct. 15, 2024

(54) APPARATUS FOR METERING COFFEE BEANS

(71) Applicant: Creatrix AG, Herisau (CH)

(72) Inventors: Louis Deuber, Richterswil (CH); Claudio Foscan, Jona (CH); Patrick Schrepfer, Wattwil (CH); Christian Schultheiss, Hittnau (CH)

(73) Assignee: Creatrix AG, Herisau (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/062,824

(22) Filed: Dec. 7, 2022

(65) Prior Publication Data

US 2023/0097467 A1    Mar. 30, 2023

Related U.S. Application Data

(63) Continuation of application No. 16/956,022, filed as application No. PCT/EP2018/086732 on Dec. 21, 2018, now Pat. No. 11,547,244.

(30) Foreign Application Priority Data

Dec. 22, 2017 (EP) .................................... 17210032
May 31, 2018 (EP) .................................... 18175384
Oct. 5, 2018 (EP) .................................... 18198887

(51) Int. Cl.
*A47J 42/18* (2006.01)
*A47J 31/42* (2006.01)
(Continued)

(52) U.S. Cl.
CPC ............... *A47J 42/18* (2013.01); *A47J 42/16* (2013.01); *A47J 42/46* (2013.01); *A47J 42/50* (2013.01); *A47J 42/56* (2013.01)

(58) Field of Classification Search
CPC .. A47J 42/18; A47J 42/16; A47J 42/46; A47J 42/50; A47J 42/26; A47J 42/28; A47J 42/42
See application file for complete search history.

(56) References Cited

U.S. PATENT DOCUMENTS 2,584,781 A    2/1952   Beatty
4,961,517 A    10/1990  Tkac
(Continued)

FOREIGN PATENT DOCUMENTS

CN        1449349 A       10/2003
CN      102395304 A        3/2012
(Continued)

OTHER PUBLICATIONS

English translate (WO2015104192A1), retrieved date Apr. 11, 2023.*

*Primary Examiner* — Mohammed S. Alawadi
(74) *Attorney, Agent, or Firm* — The Webb Law Firm

(57) ABSTRACT

An apparatus for dosing coffee beans for the purpose of selecting a metered quantity to be ground comprises a portioning device with a metering chamber having a receiving volume for receiving the coffee beans. The receiving volume is variable. Preferably, the setting of the metered quantity is performed mechanically, wherein the effect of the settings on the portioning device takes place mechanically. Preferably, the apparatus comprises a setting ring for manually adjustment of the metered quantity.

17 Claims, 27 Drawing Sheets

(51) Int. Cl.
*A47J 31/44* (2006.01)
*A47J 42/08* (2006.01)
*A47J 42/16* (2006.01)
*A47J 42/46* (2006.01)
*A47J 42/50* (2006.01)
*A47J 42/56* (2006.01)

(56) References Cited

U.S. PATENT DOCUMENTS

| | | |
|---|---|---|
| 4,961,521 A | 10/1990 | Eckman |
| 5,201,474 A | 4/1993 | Midden |
| 5,542,583 A | 8/1996 | Boyer et al. |
| 6,339,985 B1 | 1/2002 | Whitney |
| 7,350,455 B2 | 4/2008 | Vetterli |
| 7,451,901 B2 | 11/2008 | Ranney |
| 7,934,670 B2 | 5/2011 | Ford |
| 8,556,199 B2 | 10/2013 | van Os et al. |
| 8,783,164 B2 | 7/2014 | Tanja et al. |
| 9,011,955 B2 | 4/2015 | de Graaff et al. |
| 9,339,141 B2 | 5/2016 | Van Os et al. |
| 9,510,710 B1 | 12/2016 | Kaminski et al. |
| 9,854,944 B2 | 1/2018 | Ohta et al. |
| 9,980,599 B2 | 5/2018 | Van Os et al. |
| 2002/0153438 A1 | 10/2002 | Glucksman et al. |
| 2003/0150748 A1 | 8/2003 | Crawley |
| 2003/0205584 A1 | 11/2003 | Niggemyer |
| 2005/0017107 A1 | 1/2005 | Steckhan |
| 2006/0201339 A1 | 9/2006 | Vetterli |
| 2006/0204353 A1 | 9/2006 | Bonerb |
| 2007/0000943 A1 | 1/2007 | Morgan |
| 2010/0308141 A1 | 12/2010 | Bich |
| 2011/0220242 A1 | 9/2011 | Yang et al. |
| 2011/0256273 A1 | 10/2011 | de Graaff et al. |
| 2012/0070546 A1 | 3/2012 | Tanja et al. |
| 2012/0118165 A1 | 5/2012 | Van Os et al. |
| 2013/0058744 A1 | 3/2013 | Mothersbaugh et al. |
| 2013/0091802 A1 | 4/2013 | Bentley et al. |
| 2013/0095218 A1 | 4/2013 | de Graaff et al. |
| 2013/0095219 A1 | 4/2013 | de Graaff et al. |
| 2013/0099028 A1 | 4/2013 | Richard et al. |
| 2013/0101717 A1 | 4/2013 | de Graaff et al. |
| 2013/0115342 A1 | 5/2013 | Van Os et al. |
| 2013/0115351 A1 | 5/2013 | Van Os et al. |
| 2014/0202581 A1* | 7/2014 | Tanja ............... A23F 5/08 426/115 |
| 2014/0361107 A1 | 12/2014 | Steiner |
| 2015/0118367 A1 | 4/2015 | Os et al. |
| 2015/0157166 A1* | 6/2015 | Van Os ............... A47J 42/50 99/289 R |
| 2015/0201796 A1 | 7/2015 | Kuempel et al. |
| 2016/0058244 A1 | 3/2016 | Laffi |
| 2016/0236231 A1 | 8/2016 | Chastine et al. |
| 2016/0316957 A1 | 11/2016 | Tran |
| 2016/0338525 A1 | 11/2016 | Fain |
| 2016/0367072 A1 | 12/2016 | Boone et al. |
| 2017/0174418 A1 | 6/2017 | Cai |
| 2019/0039821 A1 | 2/2019 | Brussa et al. |
| 2020/0069106 A1 | 3/2020 | Zimmermann |
| 2020/0163487 A1 | 5/2020 | Kihara et al. |
| 2020/0315401 A1 | 10/2020 | Deuber |
| 2021/0221667 A1 | 7/2021 | Venkatakrishnan et al. |
| 2021/0307559 A1 | 10/2021 | Kihara et al. |
| 2021/0361119 A1 | 11/2021 | Valsecchi |
| 2021/0386245 A1 | 12/2021 | Dayton |

FOREIGN PATENT DOCUMENTS

| | | | |
|---|---|---|---|
| CN | 102525271 A | 7/2012 | |
| CN | 102970907 A | 3/2013 | |
| CN | 104274077 A | 1/2015 | |
| CN | 105007785 A | 10/2015 | |
| CN | 105395057 A | 3/2016 | |
| CN | 207506451 U | 6/2018 | |
| DE | 9308402 U1 | 2/1994 | |
| DE | 202007015307 U1 | 1/2008 | |
| DE | 202009013642 U1 | 1/2010 | |
| DE | 102011076247 U1 | 11/2012 | |
| EP | 1700549 A1 | 9/2006 | |
| EP | 1964498 A1 | 9/2008 | |
| EP | 2087820 A1 | 8/2009 | |
| EP | 2116161 A1 | 11/2009 | |
| FR | 2565088 A1 | 12/1985 | |
| FR | 2755431 A1 | 5/1998 | |
| GB | 2438803 A | 12/2007 | |
| JP | S597153 U | 1/1984 | |
| JP | 20116088 A | 1/2011 | |
| JP | 2014530684 A | 11/2014 | |
| JP | 2015204958 A | 11/2015 | |
| JP | 2017500091 A | 1/2017 | |
| JP | 2018512050 A | 5/2018 | |
| NL | 2007826 C2 | 5/2013 | |
| RU | 2521732 C2 | 7/2014 | |
| RU | 2561027 C2 | 8/2015 | |
| WO | 0228244 A1 | 4/2002 | |
| WO | 2004098361 A2 | 11/2004 | |
| WO | 2006070257 A2 | 7/2006 | |
| WO | 2010001428 A2 | 1/2010 | |
| WO | 2010033023 A2 | 3/2010 | |
| WO | 2010064912 A2 | 6/2010 | |
| WO | 2010095937 A1 | 8/2010 | |
| WO | 2011102715 A2 | 8/2011 | |
| WO | 2011102720 A2 | 8/2011 | |
| WO | 2013078437 A1 | 5/2013 | |
| WO | 2013048707 A1 | 4/2014 | |
| WO | 2015077367 A2 | 5/2015 | |
| WO | WO-2015104192 A1 * | 7/2015 | ............ A47J 42/50 |
| WO | 2016113258 A1 | 7/2016 | |
| WO | 2019122397 A1 | 6/2019 | |

* cited by examiner

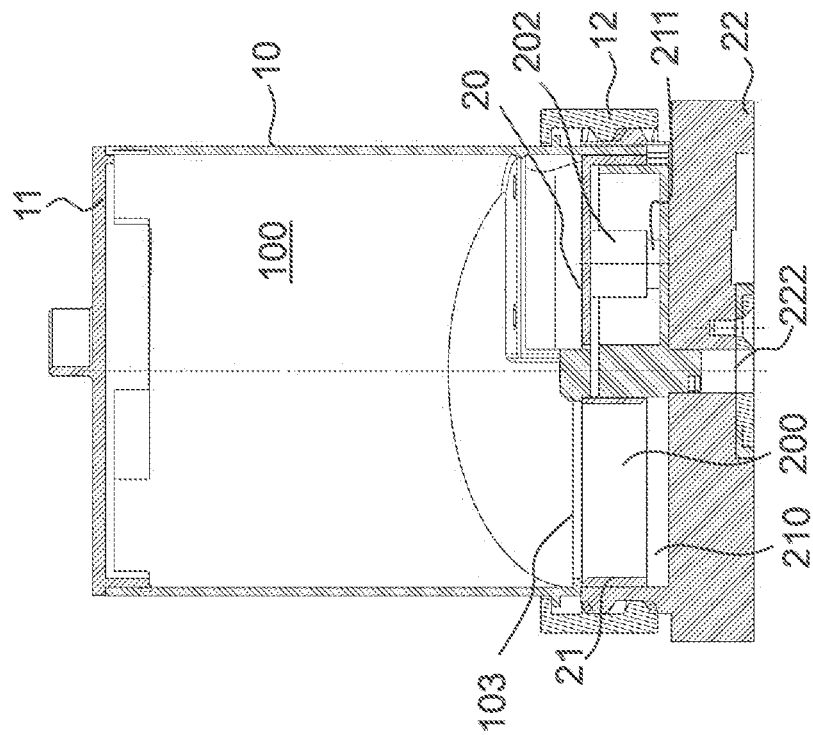
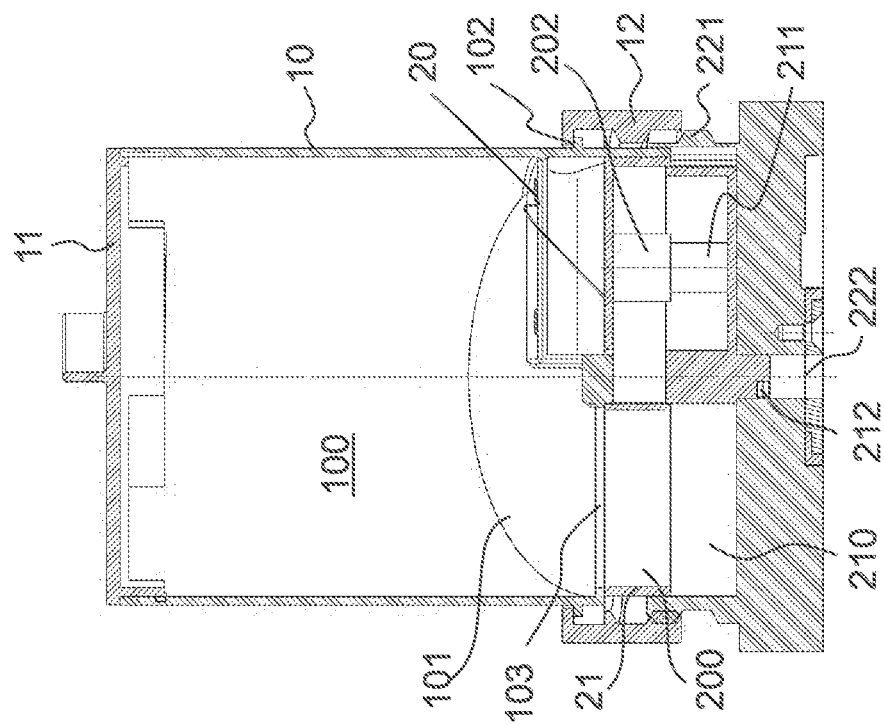

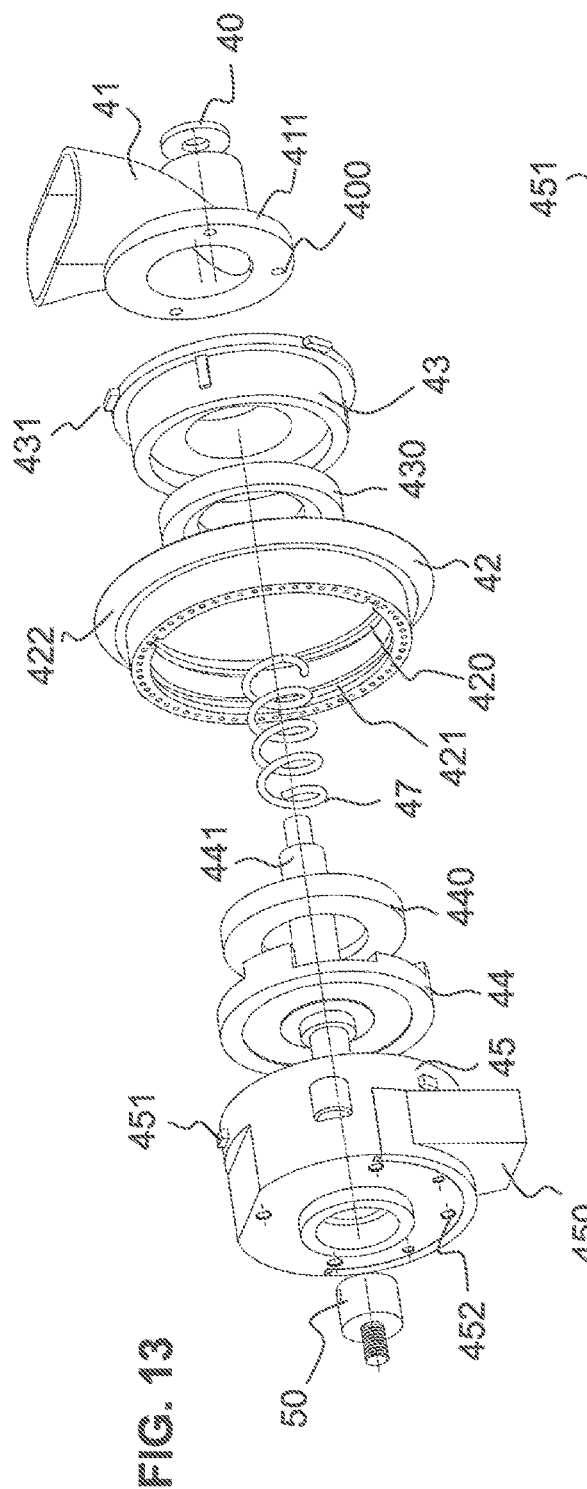
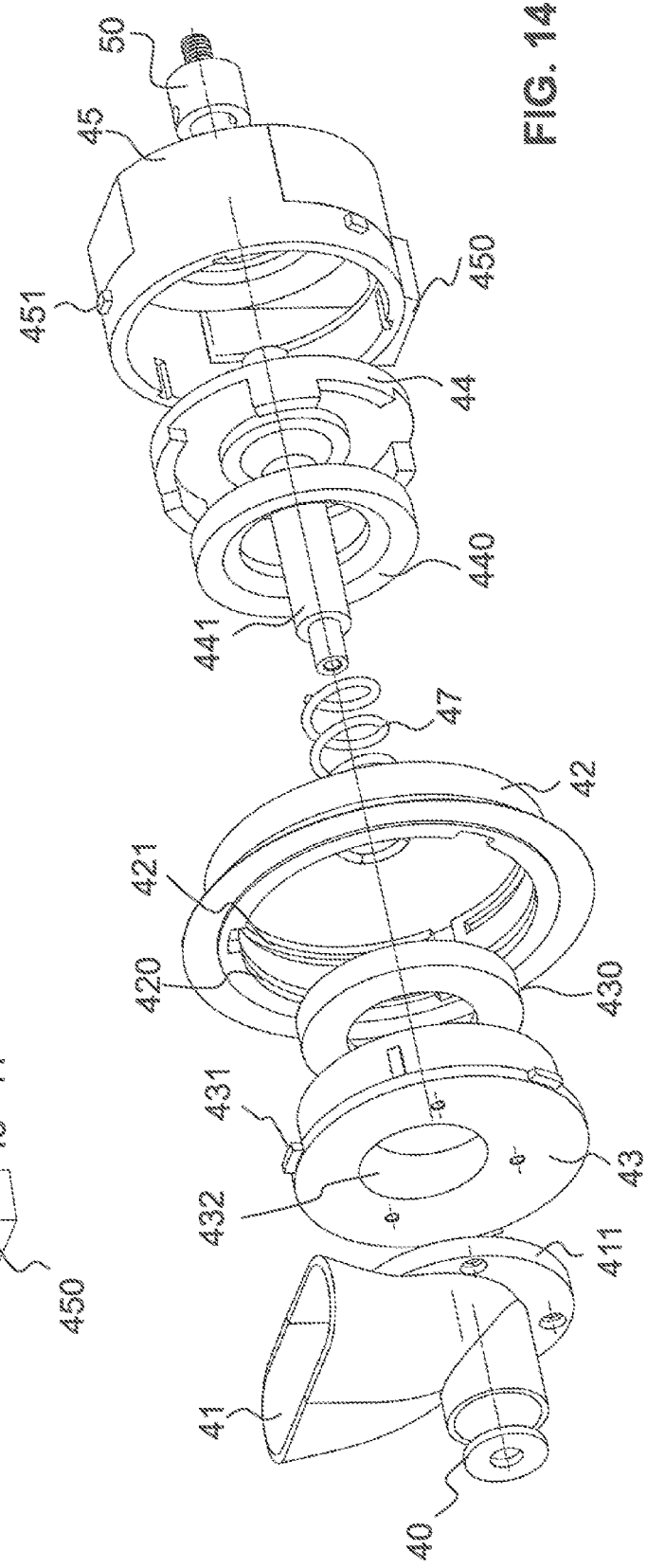

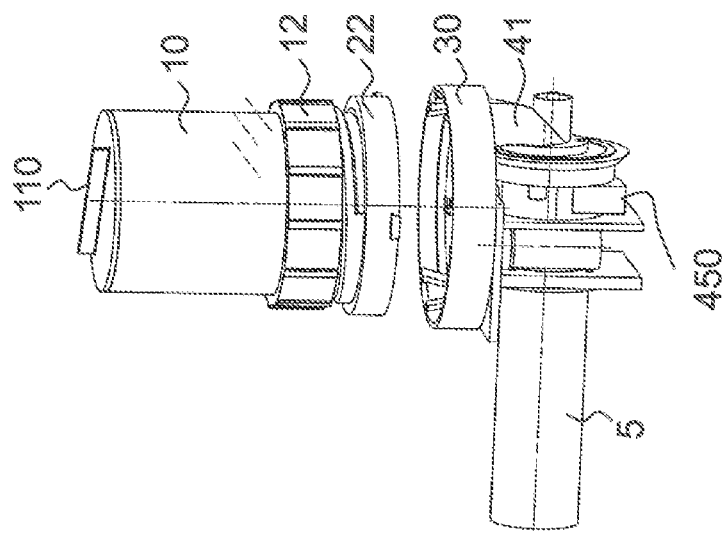
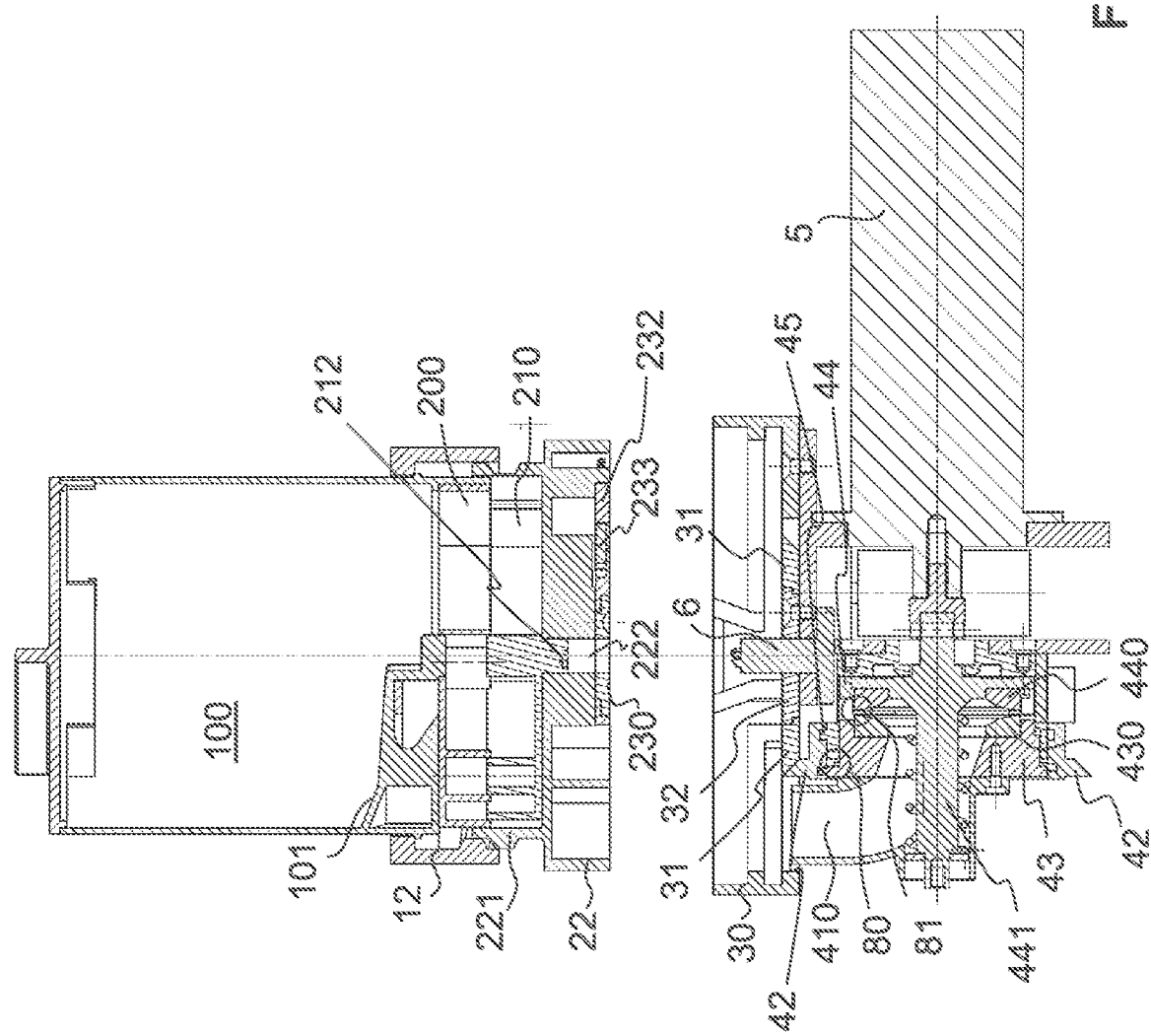

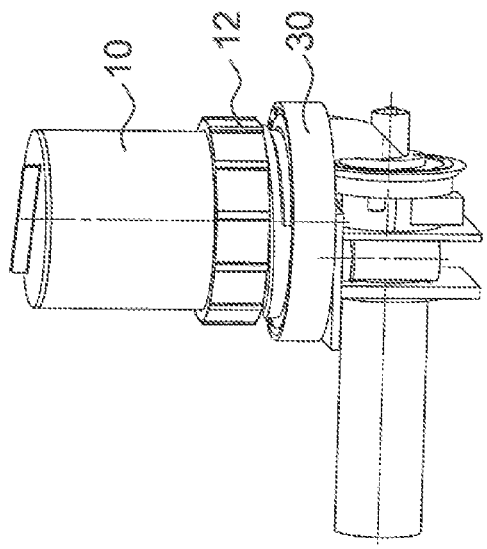
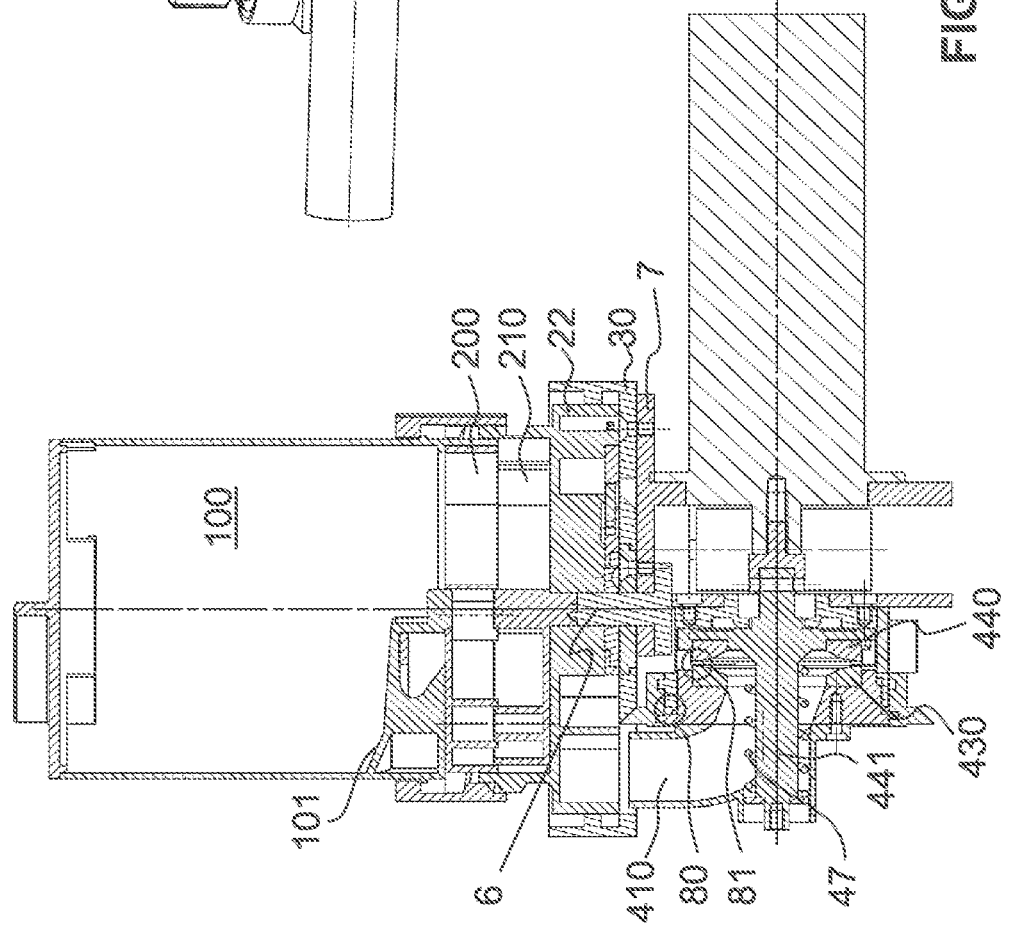

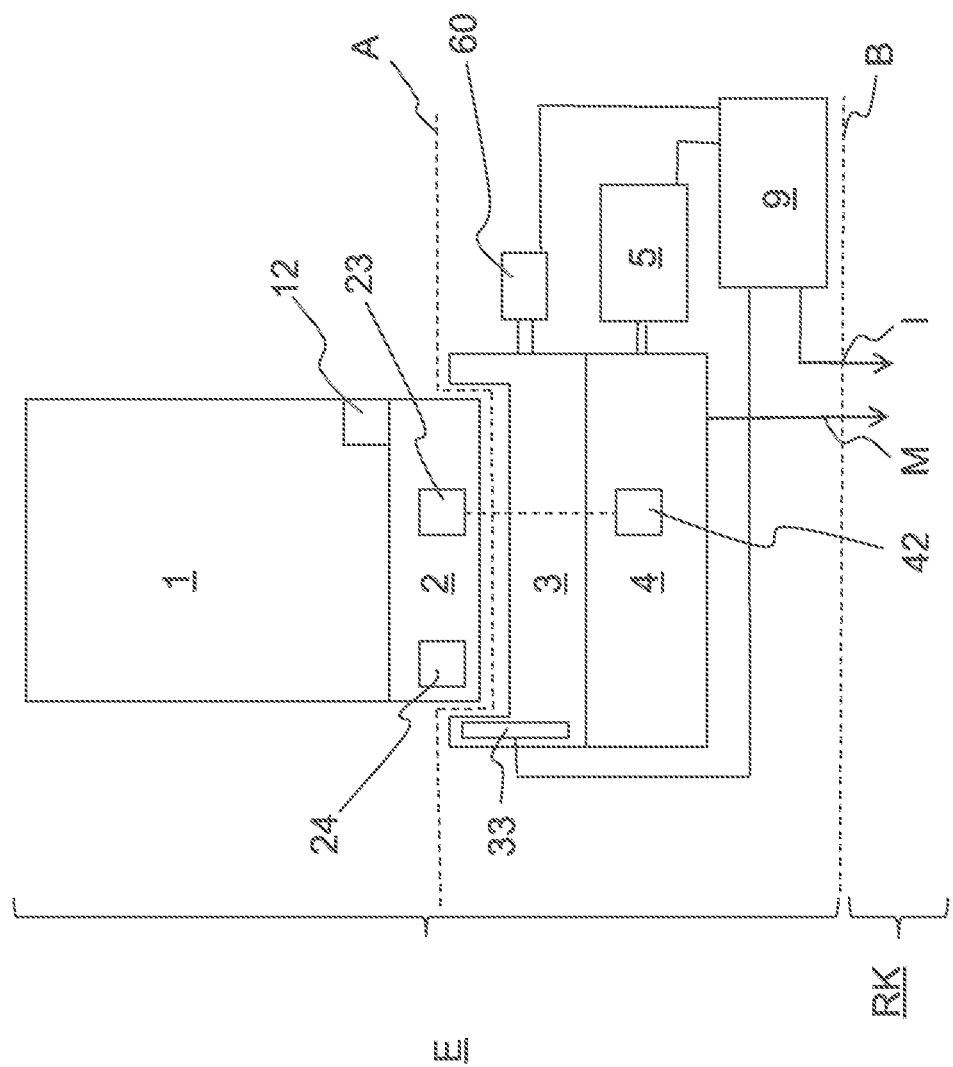

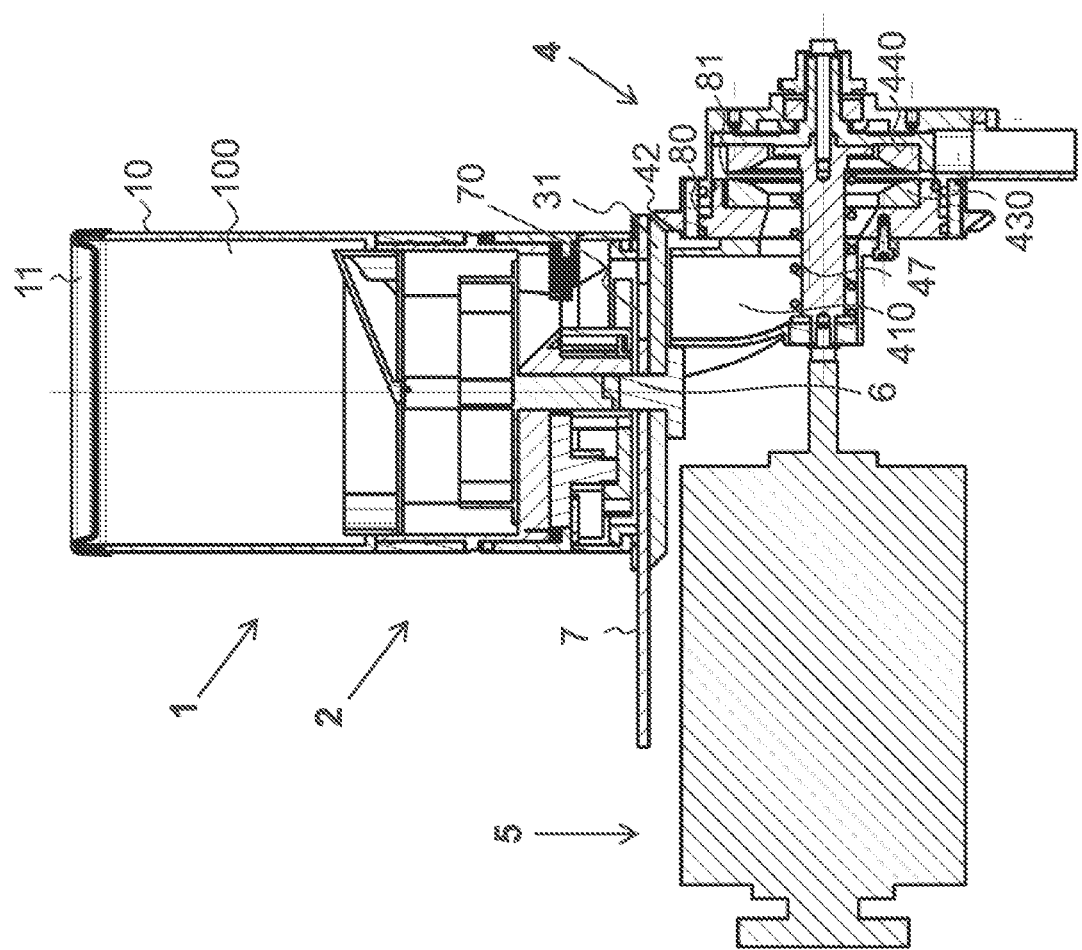

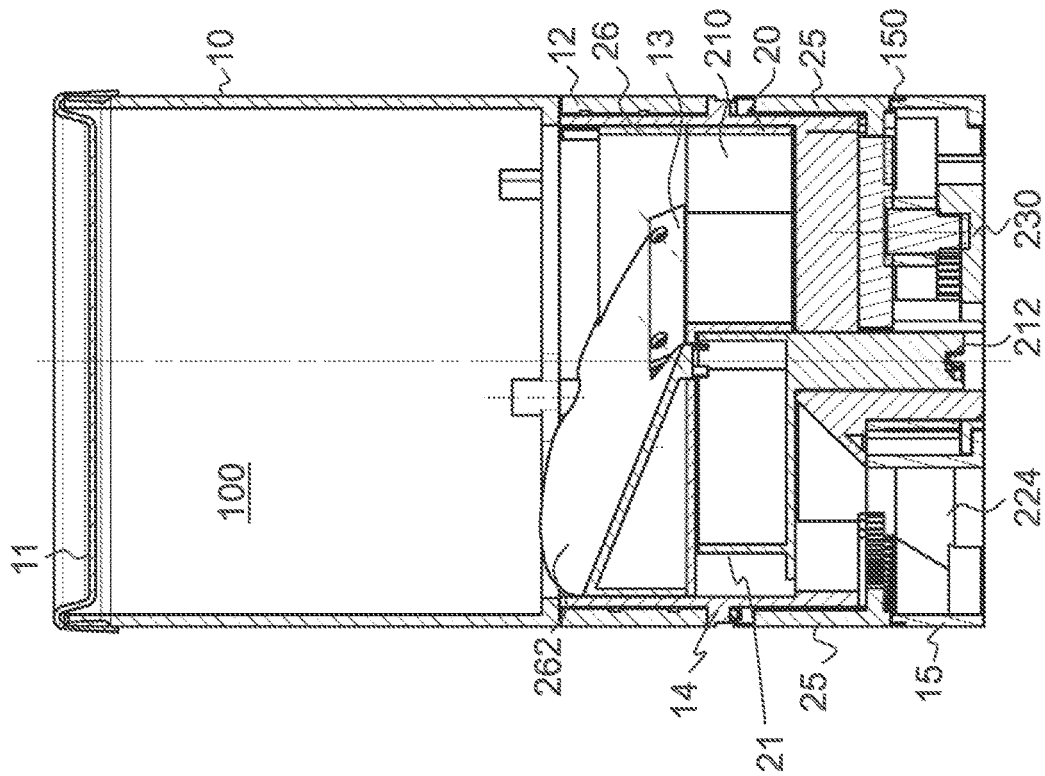
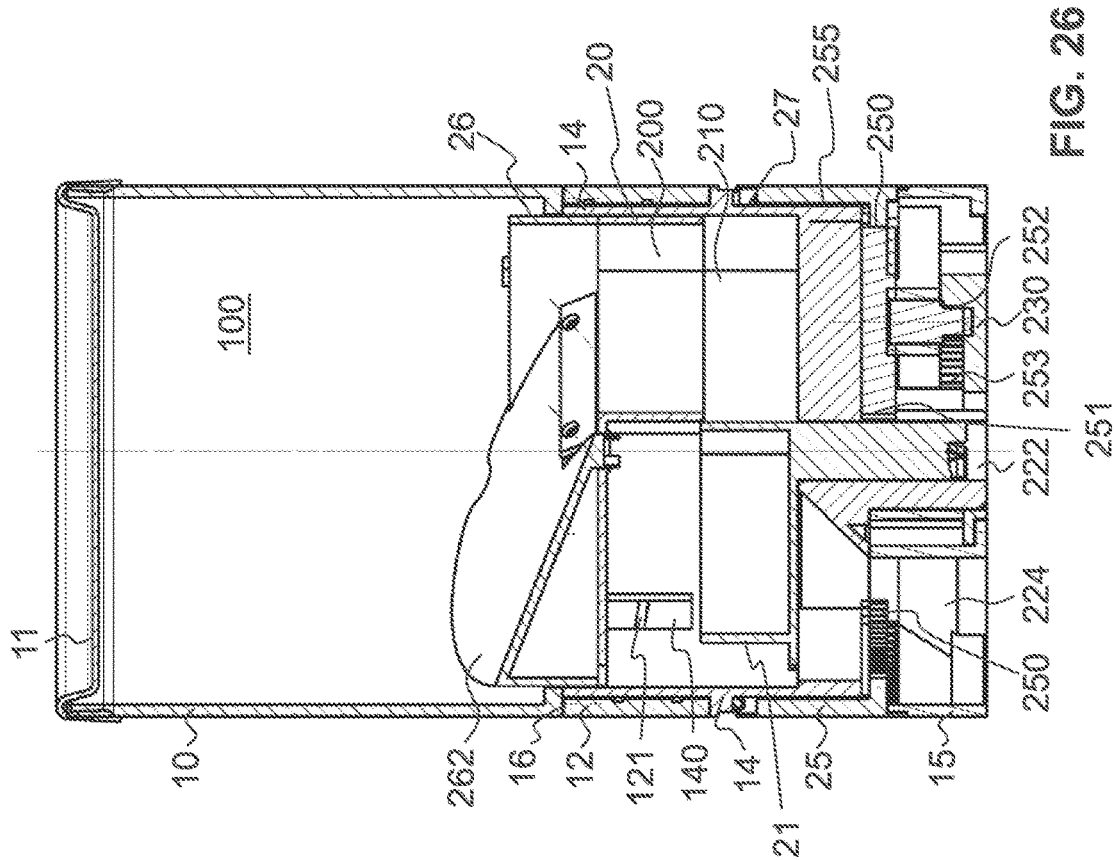

APPARATUS FOR METERING COFFEE BEANS

CROSS REFERENCE TO RELATED APPLICATIONS

This application is a continuation of U.S. patent application Ser. No. 16/956,022 filed Dec. 21, 2018, which is the United States national phase of International Application No. PCT/EP2018/086732 filed Dec. 21, 2018, and claims priority to European Patent Application Nos. 17210032.3 filed Dec. 22, 2017, 18175384.9 filed May 31, 2018, and 18198887.4 filed Oct. 5, 2018, the disclosures of which are hereby incorporated by reference in their entirety.

BACKGROUND

The present invention relates to an apparatus for metering coffee beans, in particular in combination with a unit of a coffee apparatus for preparing a coffee beverage, in particular of a coffee machine for brewing a coffee beverage or of an espresso coffee grinder.

TECHNICAL CONSIDERATIONS

Coffee is a natural stimulant which requires expert preparation. In order for coffee to be able to develop its aroma in an optimal manner, the coffee beans should always be ground just immediately prior to preparing the coffee, for example. However, this is often not sufficient in order to guarantee an optimum coffee experience.

In each grinding cycle, significant residuals of ground coffee powder remain in the grinder, in the powder duct, and in the metering unit. This leads to freshly ground coffee being mixed with old coffee powder. For this reason, the machine manufacturers recommend in most cases to discard two to three servings of coffee when a coffee machine has not been used for some time. The coffee may otherwise taste rancid because old coffee powder has to some extent been used in the preparation.

Moreover, the aroma of the subsequently brewed coffee beverage, in particular when changing the type of coffee, is negatively influenced by virtue of said residuals, since types are mixed in the machine when a change of the type of coffee takes place.

In existing coffee machines there is furthermore also the disadvantage that not the exactly predetermined quantity of coffee powder is used for producing the beverage but that in each case a non-defined mixed quantity of old and new coffee powder makes its way into the brewing unit.

The correct grinding degree is furthermore very important in order for all aromatic substances to develop in an optimal manner. In fully automatic coffee machines, coffee powder is typically produced from espresso beans and, for example, from latte coffee beans or else from lungo beans, using the same degree of fineness. However, it is extremely important that the corresponding dark-roasted or lightly roasted coffee beans are also ground using the correct grinding degree.

A plurality of systems which enable the preparation of a coffee beverage from the coffee bean to the brewed beverage in the coffee cup are known. Said systems to some extent also address the above problems without however offering a cost-effective and comprehensive solution.

The systems disclosed in WO 2011/102720A1 are relatively complicated and complex and thus too expensive for domestic use.

EP 1700549 proposes to use at least two bean containers having in each case one associated grinder. Machines of this type are however too expensive for domestic use. Moreover, the set of problems pertaining to the trapped residual amounts and to the loss of aroma is not eliminated thereby.

WO 2013/078437 proposes to clean the machine between individual brewing procedures. This solution is likewise too expensive for domestic use and is also too time-consuming for commercial applications.

Furthermore known are different metering devices for coffee beans. U.S. Pat. No. 2,584,781 and FR 2755431 thus disclose rotatable metering chambers for coffee, tea, sugar, cocoa powder, or flour. DE 9308402U discloses a coffee powder container having an integrated rotatable metering chamber. This container is intended to be subsequently held above a filter so as to pour the pre-metered quantity of coffee powder into the filter. Hot water is subsequently poured into the filter and a plurality of portions of coffee are thus conjointly brewed. FR 2565088 shows a metering device in the form of a chamber between a coffee bean container and a grinder. The metering device is rotated about a horizontal axis so as to feed a predefined quantity of beans into the grinder.

SUMMARY OF THE INVENTION

It is therefore an object of the invention to achieve an apparatus which in a simple manner enables a coffee beverage to be prepared in an optimal manner.

Preferably, the coffee aroma shall not be compromised by previous preparations and the user shall not have to carry out time-consuming adjustments on the coffee apparatus.

This object is achieved by an apparatus having the features of claim 1.

The unit according to the invention of a coffee apparatus, in particular of a coffee machine for brewing a coffee beverage or of an espresso coffee mill, has a coffee bean container for storing the coffee beans, a portioning device for metering the coffee beans for a coffee beverage, and a grinder for grinding the metered coffee beans. The coffee bean container and the portioning device are configured in a common container module. The unit has a module receptacle to which the container module when in use is connectable and from which said container module after use is removable. The container module has user-selectable settings of a metered quantity and of a grinding degree, wherein the setting of the metered quantity affects the portioning device and the setting of the grinding degree affects the grinder.

A coffee apparatus in this text is understood to be a coffee machine having a grinder and a brewing apparatus, or else a coffee mill which in terms of the housing grinds coffee beans separately from a brewing apparatus but can make available said coffee beans for use soon or directly thereafter, respectively, in a brewing apparatus. Said coffee mills are usually referred to as espresso coffee mills wherein said espresso coffee mills, depending on the embodiment, can also provide coffee powder for lungo coffees and dual-portion coffees in one single grinding procedure. For reasons of simplicity, mention in the text hereunder is made only of coffee machines, wherein the coffee mills described above and similar apparatuses for preparing the coffee are included.

A "coffee beverage" in this text is usually understood to be a single cup or two cups of coffee, since the coffee machines are in each case configured for this type of simultaneous preparation. However, the term also comprises the preparation of a larger quantity of coffee, for example a small can of coffee which is filled with coffee from a single metering procedure and a single grinding procedure.

Since the settings pertaining to the grinding degree and to the metering, which depend on the type of coffee bean and also on the taste of the respective user, can be set directly on the container module, said settings are fixedly associated with the stored type of coffee bean. Since said settings are taken into account and implemented without any further action by the user when connecting the container module to the remaining part of the coffee machine, said settings do not have to be set again on the machine each time this type of coffee is used again. The handling is thus simple, and the susceptibility to errors is minimized. Since the portioning device is disposed conjointly with the coffee bean container in one module, aromatic substances which remain in the portioning device cannot compromise any subsequent use since the same type of coffee is indeed used again, or since the container module including the portioning device is indeed replaced when changing the type of coffee.

It is recommended to design or to operate, respectively, the grinder such that said grinder is completely emptied after each grinding procedure and no ground coffee powder remains in the grinder. Solutions to this end are well known.

The unit according to the invention thus at all times offers freshly brewed coffee without compromising the aroma. Changing of the type of bean is possible in a simple manner. The remaining beans can be stored without the loss of aroma, thanks to the container module which is closable in an airtight or almost airtight manner. The settings on the coffee machine can be changed in a simple manner depending on the beans and the user, wherein parameters once set for a type of coffee do not have to be set again when the machine is used later, even when another type of coffee has been brewed in the intervening time. Since the container module does not have to have any electronic components, said container module can be produced in a relatively cost-effective manner. In other embodiments, in particular for the hospitality sector or for machines in a higher price category, the container module preferably also has electronic components.

In simple embodiments, all of the settings are performed manually, and the effect of the settings on the portioning device or the grinder, respectively, takes place by mechanical means. In other embodiments, parts thereof are electronically controlled.

Depending on the embodiment, the machine is started, that is to say the grinding procedure and the brewing procedure are performed, after carrying out the settings on the portioning device and on the grinder. In other embodiments, a brewing program can be set on the machine, for example the brewing temperature and/or the duration of the grinding procedure and/or of the brewing procedure, depending on the type of coffee or the individual requirements of the user. In further embodiments, the container module has corresponding instructions to the user or to the control system of the coffee machine. If the control system of the coffee machine is to automatically implement these additional items of information, a reading apparatus for identifying said items of information pertaining to the type of coffee or other settings and for transmitting said items of information to the control system is preferably present in the receptacle module or at another suitable location of the coffee machine.

The setting of the metered quantity and/or the setting of the grinding degree are/is preferably able to be carried out manually. Depending on the embodiment, one or both of said settings is/are to be able to be carried out prior to connecting the container module to the module receptacle. On account thereof, the desired settings can be performed already when filling the container, and all settings have been preset in the desired manner when said container is used. Moreover, filled containers of this type can already be marketed with recommended pre-settings. Moreover, fresh setting does not have to be performed for each new use, wherein the setting can however of course also be changed for every new use. In other embodiments, one of the settings, or both of the settings, is/are alternatively or additionally still able to be changed even after connecting the container module to the module receptacle. On account thereof, different variants of settings can be tested without the container module having to be removed between said settings.

In preferred embodiments a rotation safeguard which prevents the portioning device from being prematurely emptied is present. This rotation safeguard is preferably cancelled when the container module is fastened or placed, respectively, almost completely or completely on the coffee apparatus.

The module receptacle preferably establishes a connection between the portioning device and the grinder, wherein the module receptacle and the grinder are disposed on or in a housing of the coffee machine. On account thereof, the unit is configured in a compact manner, and coffee machines for private use can also be configured using this unit.

In one embodiment, the settings of the metered quantity and of the grinding degree are performed mechanically. The effect of the settings on the portioning device and on the grinder likewise preferably takes place mechanically. This is a simple, robust and cost-effective solution, in particular for machines for private use.

In other embodiments, the settings of the portioning device and/or of the grinder are performed electronically.

In one embodiment, the effect of the setting of the grinder takes place by way of a sensor which is disposed in the module receptacle, wherein the sensor communicates with the control system of the apparatus.

In one embodiment, the container module has a writable data memory for communicating with a read/write unit of the module receptacle, wherein at least data pertaining to a current grinding degree setting of the grinder is able to be stored in the data memory.

In preferred embodiments, the portioning device after connecting the container module to the module receptacle is activatable by means of a drive which is external to the container module, so as to provide a selected metered quantity in the portioning device and to supply said metered quantity to the grinder. This solution minimizes the susceptibility to errors and simplifies the operation of the coffee machine. The user just has to dock the container module to the machine and switch on the machine.

The portioning device preferably has a metering chamber, wherein the received volume of the metering chamber is variable for the purpose of setting the metered quantity. The metering chamber is a simple and cost-effective means for processing coffee beans in the desired quantity. Sensors or other energy-consuming measuring means on the container module can be dispensed with on account thereof. The container module can thus be embodied in a relatively simple and cost-effective manner. Said container module, in particular in the absence of electronic components, can in particular be configured so as to be completely washable.

In one preferred embodiment, the portioning device has a first rotating disk and a second rotating disk, the mutual spacing of said disks being variable, and said first rotating disk and said second rotating disk being conjointly rotatable relative to the coffee bean container and relative to a base of the portioning device. The metering chamber is configured between the first rotating disk and the second rotating disk, wherein the metering chamber, depending on the rotary position of the first rotating disk and the second rotating disk, is open in relation to either of the two components of coffee bean container and grinder and closed in relation to the other of said two components.

In one preferred embodiment, the portioning device has a first chamber part and a second chamber part, said chamber parts being mutually displaceable in the axial direction. The metering chamber is configured between the first chamber part and the second chamber part. The metering chamber, depending on the rotary position of at least one of the two chamber parts, is open in relation to either of the two components of coffee bean container and grinder and closed in relation to the other of said two components.

These configurations of a metering chamber can also be used in other coffee machines, that is to say so as not to be coupled to the container module according to the invention. Said configurations of a metering chamber are therefore likewise claimed as a separate invention.

A setting ring which is disposed so as to be rotatable on a circumference of the coffee bean container is preferably present for setting the metered quantity. Depending on the embodiment, the coffee bean container or the portioning device when setting rotates conjointly with the setting ring relative to the remaining part of the module housing. However, in one preferred embodiment, the coffee bean container, and preferably likewise the remaining housing of the container module, do not conjointly rotate with said setting ring.

In preferred embodiments the grinder has two grinding disks, wherein at least one of the two grinding disks as a function of the setting of the grinding degree is displaceable when or after connecting the container module to the module receptacle.

In preferred embodiments the container module has a grinding degree setting device which when connecting the container module to the module receptacle is able to be mechanically and operatively connected to the grinder, on account of which the spacing of grinding disks of the grinder is varied.

A non-rotating fixed grinding disk is preferably displaceable by means of the setting, and a rotating race disk is not displaceable by means of the setting. The arrangement is the exact reverse in other embodiments, that is to say that the fixed grinding disk is not displaceable by means of the setting, and the race disk is correspondingly displaceable.

The setting of the grinding degree on the container module is preferably able to be operatively connected to a rotatable setting disk of the module receptacle, wherein the setting disk is operatively connected to a rotatable union nut of the grinder, and wherein a first grinding disk by virtue of the rotation of the union nut is displaceable relative to a second grinding disk such that the spacing of said disks is varied. Preferably a non-rotating is a fixed grinding disk, and the second grinding disk is a rotating race grinding disk.

This configuration of the displaceable fixed grinding disk and the axially non-displaceable race disk, in particular when said disks are disposed so as to be horizontal or almost horizontal, can also be used in other coffee machines, that is to say so as not to be coupled to the container module according to the invention. This embodiment is therefore likewise claimed as a separate invention.

The container module preferably has a setting means for setting the grinding degree, wherein said setting means is disposed on the lower side or on the circumference of the container module. The configuration on the circumference has the advantage that the setting means is better accessible and the container does not have to be tilted or even placed upside down in order for the setting to be changed. In one preferred embodiment, said setting means is a setting ring which is disposed so as to be rotatable on a circumference of the coffee bean container. The setting ring for setting the grinding degree is preferably also rotatable relative to the coffee bean container and preferably also relative to the remaining part of the external housing of the container module. "Rotatable" in the entire text is understood so as to be also pivotable about an angle of less than 360°, where this is technically expedient.

In preferred embodiments, the setting of the grinding degree is also manually variable in the case of a mounted container module. The setting of the grinding degree in the case of a mounted container module can preferably be varied in the direction of a finer grinding degree as well as in the direction of a coarser grinding degree.

In preferred embodiments, the coffee bean container is releasably connected to the portioning device, wherein the portioning device conjointly with a grinding degree setting device for setting the grinding degree forms a sub-module which is configured for connecting to the module receptacle. This releasable connection enables simpler cleaning of the container module and moreover enables that single-use coffee bean containers can be used which are disposed of after having been completely emptied.

The grinder preferably has a conveying rotor which drives the grinding disk, that is to say a rotor shaft or a rotating axle which is disposed so as to run almost or exactly horizontally, and which is connected to an electric motor. Preferably a horizontal grinder is thus used. This saves space and better guarantees that the grinder can be completely emptied after each grinding procedure.

In preferred embodiments the grinder has a bean inlet duct which is configured so as to be arcuate. This facilitates the complete and gentle emptying of the metering chamber and guarantees optimum feeding of the conveyed coffee beans into the grinder. The conveying rotor preferably extends into the bean inlet duct. This arrangement guarantees that all coffee beans are conveyed through the grinder and are thus ground by the latter. The grinder and in particular the coffee powder outlet thereof are designed such that no ground coffee powder is left behind but the entire metered quantity of the ground coffee beans in each case makes its way into the brewing unit.

The container module according to the invention has a coffee bean container for storing the coffee beans and a portioning device for metering the coffee beans for the coffee beverage, wherein the container module has connecting means for releasably connecting to the module receptacle of the coffee machine, and wherein the container module has user-selectable settings of a metered quantity and of a grinding degree. The setting of the metered quantity affects the portioning device, and the setting of the grinding degree affects the grinder. A plurality of container modules of this type can be used per coffee machine, wherein said container modules are individually connected to the module receptacle. Depending on the configuration of the coffee machine, said coffee machine may also have a plurality of module receptacles having in each case associated grinders, or having a common grinder for all module receptacles. The grinding degree setting device which mechanically acts on the grinder is preferably likewise part of the container module.

The individual container modules enable different types of coffee having already set parameters for the brewing of the coffee to be stored and for said parameters to be implemented when coupling to the coffee machine without any further input by the user. A simple, cost-effective and simple-to-operate information exchange module between the coffee container and the coffee machine has thus been achieved.

Depending on the field of application, said unit comprises the grinder, or a conventional grinder of which the interface for the grinding disk setting is to be adapted to the unit according to the invention is used. A unit in which the grinder is not part of the unit is therefore also claimed.

Further embodiments are set forth in the dependent claims.

BRIEF DESCRIPTION OF THE DRAWINGS

Preferred embodiments of the invention will be described hereunder by means of the drawings which serve only for explanatory purposes and are not to be interpreted as limiting. In the drawings:

FIG. 6 shows a longitudinal section through the container module according to FIG. 4;

FIG. 7 shows a longitudinal section through the container module according to FIG. 5;

FIG. 13 shows a first exploded illustration of a mill of the apparatus according to FIG. 1;

FIG. 14 shows a second exploded illustration of the part of the mill according to FIG. 13;

FIG. 16a shows a perspective illustration of the apparatus prior to fastening the container module to the part of the coffee machine according to FIG. 1;

FIG. 16b shows a longitudinal section through the illustration according to FIG. 16a in the view from the rear;

FIG. 17a shows a perspective illustration of the apparatus after assembling the container module and the part of the coffee machine according to FIG. 16a;

FIG. 17b shows a longitudinal section through the illustration according to FIG. 17a in the view from the rear;

FIG. 18a shows a perspective illustration of the apparatus in a rotated terminal position of the container module on the part of the coffee machine according to FIG. 16a;

FIG. 23 shows a schematic illustration of the unit according to the invention;

FIG. 25 shows a longitudinal section through the container module according to FIG. 24, combined with a grinder;

FIG. 26 shows a longitudinal section through the container module according to FIG. 24, at the maximum size of the metering chamber;

FIG. 27 shows a longitudinal section through the container module according to FIG. 24, at the minimum size of the metering chamber;

FIG. 39a shows a longitudinal section through B-B according to FIG. 38a;

FIG. 42a shows a view from above of the elements according to FIG. 41a;

FIG. 43a shows a longitudinal section through A-A according to FIG. 42a;

FIG. 44a shows an enlarged fragment according to FIG. 43a;

DESCRIPTION OF PREFERRED EMBODIMENTS

Figure 1:
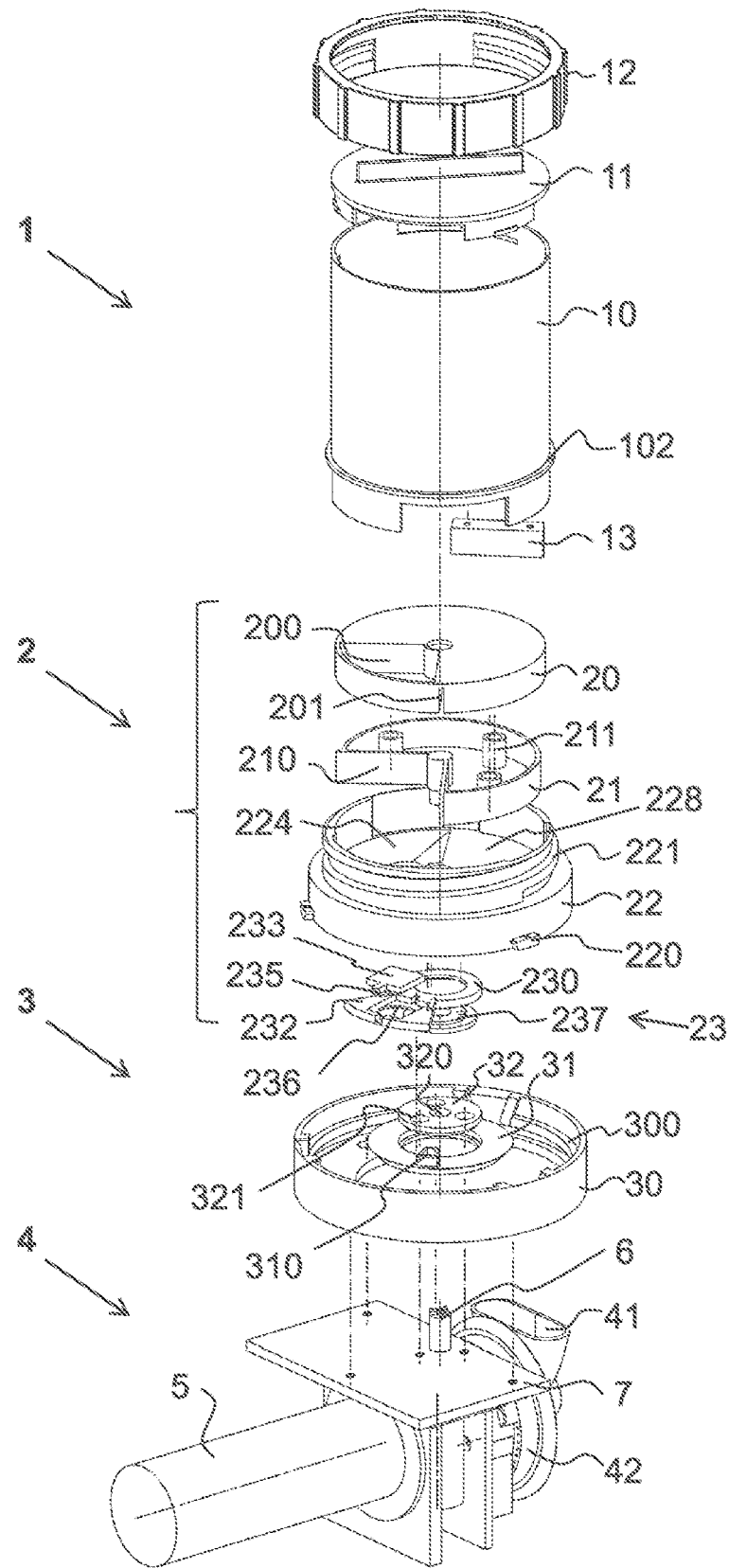
FIG. 1 shows a first exploded illustration of the apparatus according to the invention in a first embodiment, having a container module and part of the coffee machine.

The basic concept of the invention will first be described by means of the schematic illustration according to FIG. 23. Preferred embodiments of the unit according to the invention will subsequently be described by means of FIGS. 1 to 22, and 24 to 40.

A unit according to the invention of a coffee machine for grinding and brewing a coffee beverage is identified by E in FIG. 23. The unit E comprises a coffee bean container 1 and a metering device disposed thereon, here referred to as the portioning device 2. Said two components form a common container module 1, 2. The remaining part of the unit comprises a module receptacle 3, a grinder 4, and a first motor 5 for activating the grinder 4. Depending on the embodiment, a drive 60, preferably having a separate second motor for activating the portioning device 2, as well as a control system 9 for controlling a unit and for transmitting signals to the remaining part of the coffee machine RK, said control system being in particular part of a brewing unit not illustrated, are also present.

The container module 1, 2 can be placed onto the remaining part of the unit and be removed therefrom again. This is illustrated by the symbolic separation line A. The symbolic separation line B shows that the remaining part of the unit is indeed a component part of the coffee machine and is preferably integrated in the housing of the latter, but that said remaining part of the unit is preferably configured as an independent component which by way of suitable interfaces can be used in known coffee machines. The container module can preferably be tightly closed and on account thereof is suitable also for storing beans that have not yet been ground.

The container module 1, 2, preferably the bean container 1, has a setting apparatus 12 for setting the metering. Said setting apparatus 12 is preferably manually activatable and acts mechanically on the portioning device 2. Other solutions, for example electronic or electro-mechanical solutions, are however also possible.

The container module 1, 2, preferably the portioning device 2, furthermore has a grinding degree setting device 23 which acts on a grinding degree variation means 42 within the grinder. These two components can also be electronically and/or mechanically effective. Said two components preferably act in a purely mechanical manner.

In some embodiments, an identification marking 24 is present on the container module 1, 2, here on the portioning device 2. The receptacle module 3 has an associated reading apparatus 33. It is a barcode for example, and a corresponding scanner. The reading apparatus 33 is preferably connected to the electronic control system 9 of the unit which also controls the grinder motor 5 and, if present, the electric drive 60 of the portioning device 2. Alternatively, a writable data memory, for example an RFID tag, is disposed instead of or additionally to the marking 24 on the container module 1, 2, said writable data memory containing at least information pertaining to the grinding degree.

The container module 1, 2 is preferably provided with basic information pertaining to the grinding degree and to the portioning, said basic information enabling the settings of the portioning device 2 and of the grinder 4 to be performed in such a manner that an acceptable coffee is already brewed in the initial use of the container module 1, 2. This basic information can be changed by the user prior to or only after the initial use, depending on the embodiment.

The setting of the portioning device 2 leads to a correct quantity of coffee beans to be provided. This preferably takes place only once the container module 1, 2 is placed onto the module receptacle 3 and the coffee machine is switched on. The drive 60 then activates the already pre-set portioning device 2.

Further items of information I can also be read and be transmitted to the control system 9 when connecting the container module 1, 2 to the remaining part of the coffee machine.

When connecting the container module 1, 2 to the remaining part of the coffee machine, the desired grinding degree which has been set at the container module 1, 2 is furthermore transmitted to the grinder 4 and the latter is correspondingly set. Here too, the choice of the grinding degree and the setting of the grinder 4 preferably takes place by way of purely mechanical means. However, electronic or electro-mechanical means can also be used.

Grinding having taken place, the coffee powder M for further processing makes its way into the remaining part of the coffee machine RK. The container module can be used for a next preparation, or said container module can be removed and stored. A second container module 1, 2 with another type of coffee bean can now be connected to the coffee machine, and another type of coffee can be provided without any further complexity and without the flavor being mixed with that of the preceding type of coffee.

FIG. 1 shows an exploded illustration of a specific example of the unit according to the invention or apparatus according to a first embodiment, respectively.

The coffee bean container 1 for receiving coffee beans for a plurality of beverage portions has a hollow-cylindrical can 10 which at the top is closable in an almost airtight manner by way of a lid 11. The partially open base of the can 10 is contiguous to the portioning device 2 which is described hereunder and which closes the can 10 on the lower side thereof in a preferably almost airtight manner. Depending on the embodiment, said can may be closed in an airtight manner by means of a lid or a correspondingly designed closure means. The unit formed by the coffee bean container 1 and the portioning device 2 is thus suitable for storing coffee beans.

A handle element 110 is disposed on the lid 11 so as to be able to more easily lift and close the lid 11. The setting apparatus 12 is preferably a setting wheel, here referred to as a setting ring 12. The setting ring 12 is pushed over the can 10 and bears on an encircling shoulder 102 of the can 10. The can 10 has a lower base 101 which with the exception of an outlet opening, here referred to as the can outlet 103, is configured so as to be closed. Said can outlet 103 is preferably configured in the shape of the sector of a circle. The base 101 is preferably at least partially configured as an incline and slopes toward the can outlet 103 such that all coffee beans situated in the interior space 100 of the can 10 are guided to the can outlet 103 without any active conveying means. The interior space 100, the base 101, as well as the can outlet 103 can be readily seen in FIGS. 6, 7, as well as 16a to 18b, for example. A flexible, preferably soft diversion lip 13 is disposed on the periphery of the can outlet 103 on the base 101. Said diversion lip 13 in FIG. 1 is illustrated as a component which has not yet been mounted. Sufficient free space such that jammed coffee beans can divert and are not fixedly jammed or even broken is available behind the diversion lip 13.

The metering unit, here referred to as the portioning device 2, is disposed below the coffee bean container 1. Said metering unit enables the feeding of an exactly metered quantity of unground coffee beans into the grinder 4 which is disposed downstream. The metered quantity preferably corresponds to a single beverage portion, that is to say that quantity of beans that is required for brewing ground coffee powder for a single cup of coffee. The portioning device 2 herein is capable of being set so as to vary the metered quantity depending on the type of coffee and/or depending on the preference of the coffee drinker.

The portioning device 2 in this example is configured with a metering chamber which can be set by way of a rotating movement. The portioning device 2 has an upper rotating disk 20 which has an inherently closed annular casing. The upper rotating disk 20, with the exception of a first sector which is configured as a passage opening, has a closed planar cover face which is directed upward. Said first sector forms an upper chamber part 200.

The portioning device 2 furthermore has a lower rotating disk 21 which has a planar base face which is directed downward and which, with the exception of the second sector, is likewise configured so as to be closed. The second sector of the lower rotating disk 21 forms a lower chamber part 210. The lower rotating disk 21 forms a receptacle for the upper rotating disk 20. The upper rotating disk 20 to this end has receptacle slots 201 in the region of the first sector such that said upper rotating disk 20 can be pushed over the lower rotating disk 21. The lower rotating disk 21 has upward-directed spring holders 211 which are configured in the shape of sleeves and are preferably provided with springs which are supported in relation to the downward-directed internal side of the upper rotating disk 20. The upper rotating disk 20 preferably has corresponding fixing receptacles for the ends of the springs, and/or corresponding guiding means 202 such as pins or sleeves, for example, for connecting in a guiding manner to the spring holders 211. A guiding means 202 of this type which simultaneously serves as a receptacle for the springs can be seen in FIGS. 6 and 7.

Figure 2:
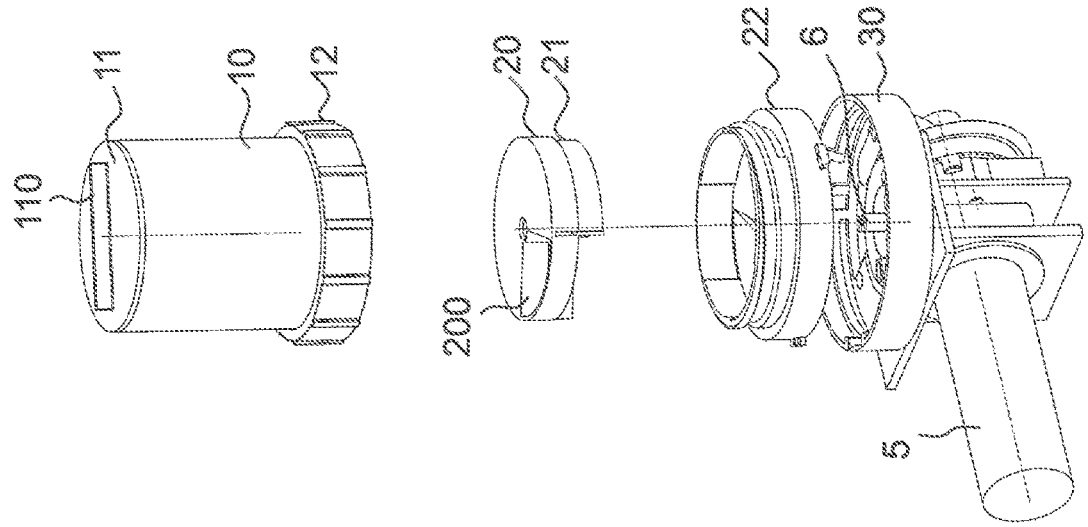
FIG. 2 shows a second exploded illustration of the apparatus according to FIG. 1.

The upper and the lower rotating disk 20, 21 are thus connected to one another in a rotationally fixed manner, wherein the spacing of said disks 20, 21 is variable in a guided manner. The guiding is performed by the spring holders 211 and the guiding means 202. The restoring force is ensured by the springs held therein. The two rotating disks 20, 21 are illustrated in the assembled state in FIG. 2. Also, the setting ring 12 in this FIG. 2 is held in the ready-for-use position on the can 10.

The two rotating disks 20, 21 are disposed in a base 22 of the portioning device 2, said base 22 being readily visible in FIG. 1. The base in this example is likewise configured so as to be circular. It has a lower base ring having radially projecting latching cams 220 as well as an upper threaded ring having a smaller diameter than the base ring. The threaded ring of the base 22 is provided with an external thread 221. The base ring of the base 22, with the exception of the chamber outlet 224, is configured so as to be closed toward the bottom. The base 22 is configured so as to be open toward the top, wherein said base 22 has an upward-directed base area which, with the exception of the chamber outlet, forms a level face 228. This face 228 forms the lower limit of the metering chamber, that is to say the base of the latter. The two rotating disks 20, 21 can be conjointly rotated relative to the base 22 of the portioning device 2 such that the connection between the two chamber parts 200, 210 and the can outlet 103 or the chamber outlet 224 is established, depending on the position of said rotating disks 20, 21.

The grinding degree setting device 23 is disposed on the outward-directed lower side of the base 22 of the portioning device 2, as can likewise be seen in FIG. 1. Said grinding degree setting device 23 has a rotating ring 230 having an arm 232 which radially projects from the former in the same plane. A window 236 in which a displacement plate 233 is displaceably held is present in the arm 232. The displacement plate 233 on one end side has a tooth 235, and on an opposite end side bears on a compression spring 234 (cf. FIG. 10). A fastening disk 237 is present on the lower side of the rotating ring 230, said fastening disk 237 having penetrating fastening bores 238, here exactly three bores, which are distributed across the circumference, as well as a central first drive axle passage opening 239.

The elements mentioned here, that is to say the coffee bean container 1 as well as the portioning device 2 which also comprises the grinding degree setting device 23, conjointly form the container module 1, 2. This container module 1, 2 can be fastened on the module receptacle 3 which is likewise illustrated in FIG. 1.

The module receptacle 3 has a receptacle body 30 which is configured so as to be circular-cylindrical and forms a tray which is open toward the top. The encircling casing of the module receptacle 3 has a bayonet closure 300. A centric bore in which an annular setting disk 31 is disposed is situated in the base of the module receptacle. The annular setting disk 31 has a level gear 312 of a bevel gear drive, as can be readily seen in FIG. 9. The teeth are not illustrated in FIG. 9. However, the toothing of the bevel gear drive can be readily seen in FIG. 21. As can likewise be seen in FIGS. 9 and 10, but also in FIG. 1, an upward-directed entrainer 310 is disposed on the setting disk 31. A fixing disk 32 which has a centric second drive axle passage opening 320 and through bores 321 that are aligned with the fastening bores 238 of the fastening disk 237 (cf. FIG. 1) is disposed in the free center of the setting disk 31. The base of the module receptacle 3, with the exception of the mentioned openings and an eccentrically disposed bean passage opening 311, is preferably configured so as to be closed (cf. FIG. 3).

The module receptacle 3 is preferably fixedly connected to the grinder 4. The module receptacle 3 and the grinder 4 are preferably component parts of a coffee machine. The coffee machine may be fully automatic. Said coffee machine can be a machine for professional use, for example in a coffee shop or a restaurant, or for the private domestic use. The coffee machine may however also be a semi-automatic machine or an electric machine of relatively simple construction for domestic use.

The machine is not completely illustrated. The parts not shown are usual known components of a coffee machine of this type. Only a base plate 7 of a housing of a coffee machine of this type is shown here. The base plate 7 can form the surface of the coffee machine or be disposed so as to be recessed in the housing of the machine. The module receptacle 3 is fastened on this base plate 7 by way of corresponding screws or other known fastening means. The grinder 4 is likewise fixed to the base plate 7. This can be readily seen in FIG. 1. In other embodiments, parts of the module receptacle 3 are disposed above the base plate and other parts below, that is to say within the housing of the coffee machine. In particular, the setting disk 31, also referred to as the adjustment wheel for the grinder 4, can be disposed within the housing.

The grinder 4 will be described in yet more detail further below in the text. Said grinder 4, as can be seen in FIG. 1, has a bean inlet 41 as well as the variation means for the grinder, here in the form of a union nut 42. The vertically aligned grinding disks 430, 440 which will be described later are disposed in said union nut 42. The grinder 4 is connected to the first motor, that is to say to the grinder motor 5. The latter is preferably an electric motor.

A drive axle 6 which protrudes upward through the base plate 7 and in the assembled state protrudes through the second drive axle passage opening 320 of the module receptacle 30 can likewise be seen in FIG. 1. Said drive axle 6, in the case of a container module 1, 2 which is in place, penetrates the first drive axle passage opening 239 as well as a third drive axle passage opening 222 of the base 22 of the portioning device 2, and is received in a rotationally fixed manner in a first drive axle receptacle 212 of the lower rotating disk 21 (cf. FIGS. 6, 16b, and 17b). The drive axle receptacle 212 is preferably configured as a jaw clutch.

Figure 3:
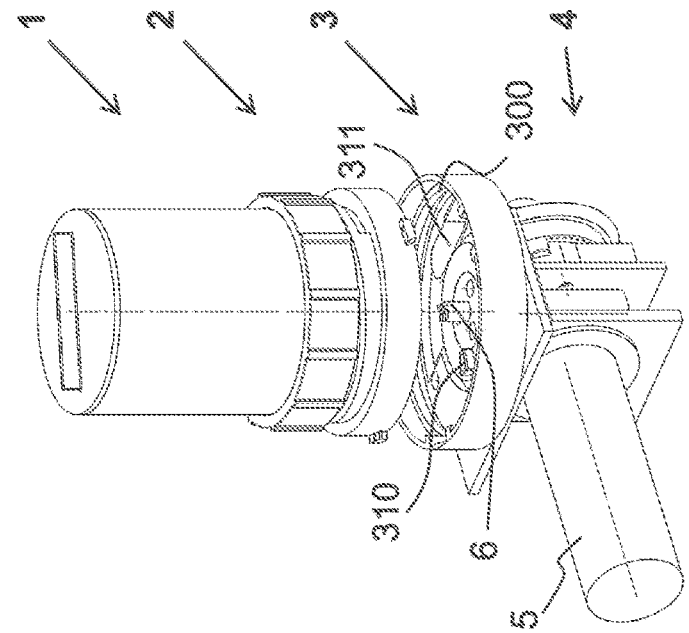
FIG. 3 shows an illustration of the container module prior to fastening to the part of the coffee machine illustrated in FIG. 1.

It can be readily seen in FIG. 3 how the container module 1, 2 can be placed onto the module receptacle 3 and thus is connectable to the grinder 4 of the coffee machine.

It can be demonstrated by means of FIGS. 4 to 8 how the setting of the metering takes place. The spacing of the upper rotating disk 20 from the lower rotating disk 21 can be selected by manually rotating the setting ring 12 along the thread 221 of the base 22 of the portioning device 2. In order for the user to obtain an indication pertaining to the position selected by him/her or to be potentially selected by him/her, a scale is present on the casing of the can 10, preferably above the rotating ring 12, or other marks are attached thereto. Said marks are not illustrated in the figures.

Figure 4:
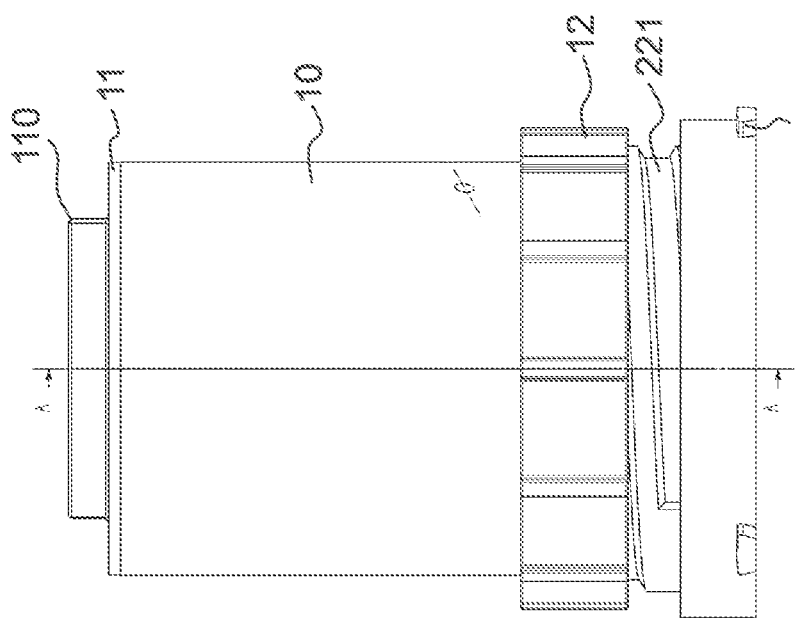
FIG. 4 shows the container module according to FIG. 1 in the assembled state in a maximum metering position.

A metering chamber having the maximum volume is illustrated in the position of the rotating ring 12 according to FIGS. 4 and 6. As can be readily seen in FIG. 6, the upper chamber part 200 and the lower chamber part 210 lie on top of one another and barely engaging one another.

Figure 5:
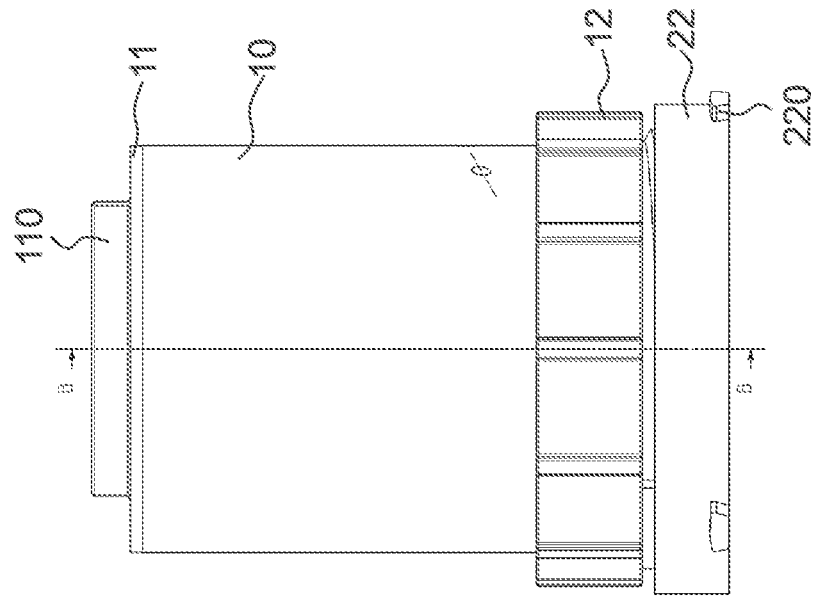
FIG. 5 shows the container module according to FIG. 1 in the assembled state in a minimum metering position.

The rotating ring 12 is turned downward in FIGS. 5 and 7, on account of which said rotating ring 12 has also entrained the can 10. The can 10 herein has not been conjointly rotated since said can 10 is secured against rotation in relation to the base 22. The rotating ring 12 moreover bears on the shoulder 102 and is rotatable relative to the latter. The can 10 herein has been pushed the upper rotating disk 20 downward against the lower rotating disk 21. The upper chamber part 200 has been pushed into the lower chamber part 210. On account thereof, the entire metering chamber has been reduced in size and minimized, as can be readily seen in FIG. 7. The movement of the setting ring 12 has thus only varied the mutual relative axial position of the two rotating disks 20, 21. The rotating disks 20, 21 have however not been rotated. The rotating ring 12 and thus the selected metering setting can be held in their respective position by way of known means, for example by means of a spring and a ball, or a ball-head compression piece.

In this exemplary embodiment, metering in the range from 5 to 20 g of beans, preferably from 7 to 15 g of beans, can be achieved by means of varying the size of the metering chamber 200, 210. Other ranges can also be achieved by selecting other dimensions on other shapes of the chamber parts.

Figure 8:
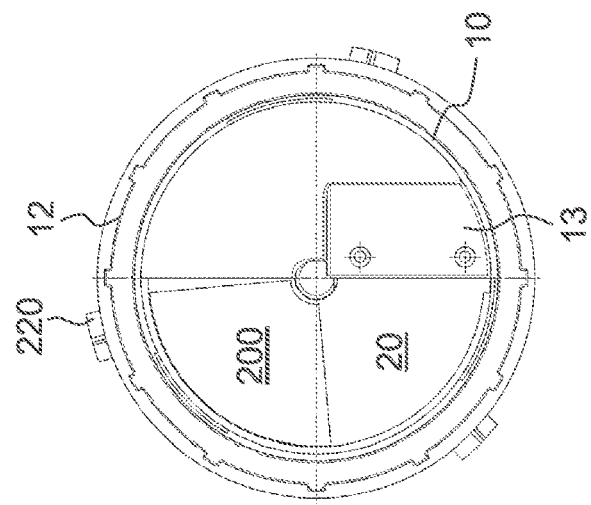
FIG. 8 shows a view from above of the container module according to FIG. 1 without a lid.

The container module 1, 2 is illustrated when viewed from above and without the lid 11 in FIG. 8. The upper rotating disk 20 having the sector-shaped cutout which forms the upper chamber part 200 can be readily seen.

The setting and thus the selection of the metering quantity preferably takes place manually by rotating the setting ring 12. The size of the metering chamber is varied on account thereof.

The metering, that is to say the measuring of the desired quantity of beans for the subsequent grinding and the subsequent preparation of the coffee, in a simple embodiment likewise takes place manually in that the chamber 200, 210 is first rotated to a filling position so as to be filled with beans from the can 10, and subsequently to an emptying position, thus to an open position above the bean inlet 41 of the grinder 4.

The metering is however preferably performed automatically when the coffee machine is activated so as to brew a portion of coffee. To this end, the portioning device 2 is preferably electrically driven. To this end, the drive axle 6 is preferably connected to the second motor or the drive 60 which is illustrated in FIG. 23. The second motor is preferably disposed within the housing of the coffee machine and is activated by way of the electronic control system of the machine. If coffee is to be brewed, said drive axle 6 is thus first activated. Since said drive axle 6 is connected in a rotationally fixed manner to the lower rotating disk 21 said drive axle 6 thus rotating entrains the lower rotating disk 21 and the upper rotating disk 20 and also the metering chamber 200, 210. The chamber 200, 210 is first moved to a position in which said chamber 200, 210 is open in relation to the interior space 100 of the can 10 such that coffee beans slide across the incline 101 into the chamber 200, 210 until the latter is full. The metering herein takes place by way of the pre-set size of the chamber 200, 210. No sensors or other measuring means are necessary to this end. The upper rotating disk 20 and the lower rotating disk 21, having the chamber 200, 210 thereof filled, are subsequently rotated until the chamber 200, 210 which is open toward the bottom comes to lie above the chamber outlet 224 of the base 22 of the portioning device 2. The coffee beans now slide out of the chamber 200, 210 and through the bean inlet 41 into the grinder 4. The grinder 4 as a function of the electronic control system of the coffee machine is activated already prior thereto, only at this point in time, or shortly thereafter.

The grinder 4 will be described hereunder by means of FIGS. 13 to 15. Said grinder 4 has the already mentioned bean inlet 41 which in this example is continuous in the form of an arcuate infeed duct 410. This component has a flange 411 having fastening bores 400 for fastening to a fixed disk flange 43, said fastening bores 400 being illustrated in FIG. 13. A counter bearing 40 for receiving and mounting a conveying rotor 441 is configured on the opposite side of the preferably integral component. The conveying rotor 441 by way of a connecting nut 50 at the opposite end thereof is connected to a drive shaft of the grinder motor 5.

The fixed grinding disk 430 is held in a rotationally fixed manner in the fixed disk flange 43. The fixed disk flange 43, as also the remaining components of the grinder 4 that will be described hereunder, has a central passage opening 432 which is penetrated by the conveying rotor 441. The fixed disk flange 43 has radially projecting cams 431 which engage in a first groove 420 of a bayonet closure of the union nut 42. The first nut 420 of the bayonet closure, in terms of the axial cross-sectional face of the union nut 42, lies on an inclined plane, that is to say at an angle in relation to the conveying rotor 441. On account thereof, the fixed disk flange 43, conjointly with the fixed grinding disk 430, is axially displaced in the rotation of the union nut 42, but said fixed disk flange 43 and said fixed grinding disk 430 are not rotated. Since the bean inlet 41 is likewise fixedly connected to the fixed disk flange 43, the bean inlet 41, conjointly with the fixed disk flange 43, is also axially displaced. This rotation of the union nut 42 takes place when placing and fixing the container module 1, 2 on the module receptacle, as has already been described by means of FIGS. 9 and 10, since the setting disk 31 on account thereof is rotated to a predefined position and drives the union nut 42.

As can be seen in FIGS. 13 and 14, a rotating race grinding disk 440 which is held in a rotationally fixed manner in a race disk flange 44 follows the fixed grinding disk 430. The race disk flange 44 is fixedly connected to the conveying rotor 441 or even configured conjointly with the conveying rotor 441 as an integral component, as is illustrated here.

The race disk flange 44 is held so as to be rotatable in a grinder housing 45. Said race disk flange 44 has a downward-directed passage opening 450 as well as cams 451 which project in a radially outward manner. The cams 451 engage in a second groove 421 of the union nut 42 such that the grinder housing 45 is held in the union nut 42, wherein said grinder housing 45 is rotatable relative to said union nut 42. The second groove 421 runs in a plane perpendicular to the conveying rotor 441 such that the race disk flange 44 and the race grinding disk 440 held therein do not move axially during the rotation.

The grinder housing 45 of the grinder 4 is rigidly positioned and by means of fastening bores 452 connected indirectly or directly to the base plate 7. The grinder housing 45 has a downward-directed coffee powder outlet 450 which leads to a brewing unit of the coffee machine (not illustrated here).

A conveying spring 47, preferably in the form of a helical spring, is preferably disposed between the counter bearing 40 and the race disk flange 44. The conveying spring 47, in particular in the form thereof configured as a helical spring, serves for conveying the coffee beans within the grinder 4. Alternatively or additionally, the conveying rotor 441 can be configured with a conveying worm so as to convey the coffee beans within the grinder 4.

Figure 15:
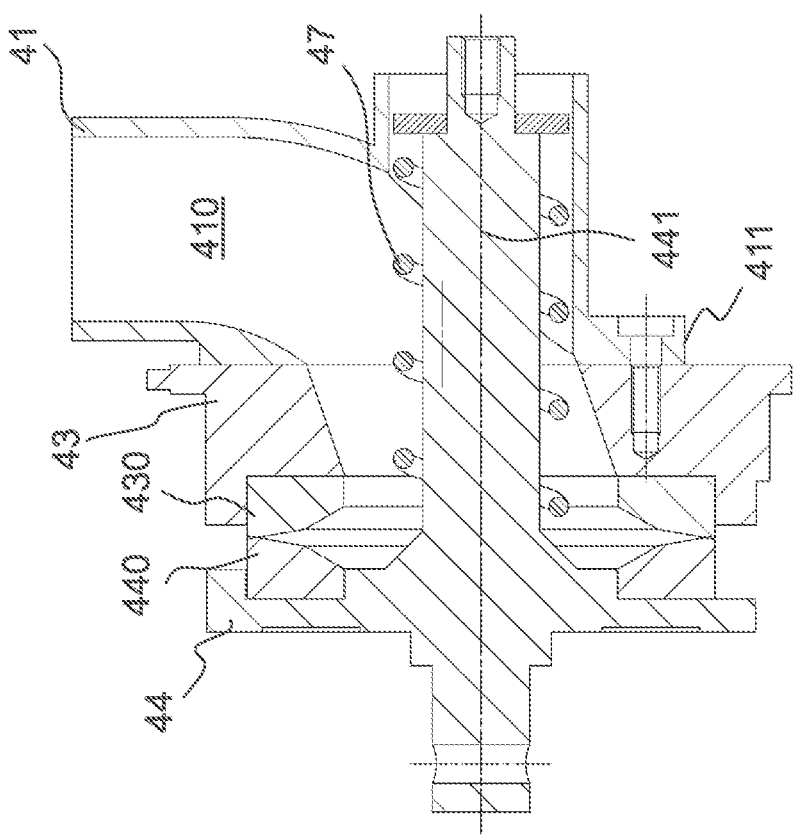
FIG. 15 shows a longitudinal section through part of the mill according to FIG. 13.

It is to be noted that the conveying rotor 441 and preferably also the conveying spring 47 extend right into the arcuate infeed duct 410, as can be readily seen in FIG. 15. The coffee beans are thus conveyed in an optimal manner already at the inlet to the grinder 4. The conveying spring 47 is preferably connected to the conveying rotor 441 in a rotationally secured manner, for example fastened to the conveying spring 47 by means of hooks or another mechanical manner.

The grinder 4 by means of the grinding degree setting device 23, also referred to as the grinder setting device, can now be set to a desired grinding degree. This will be explained hereunder by means of FIGS. 9 to 12.

Figure 10:
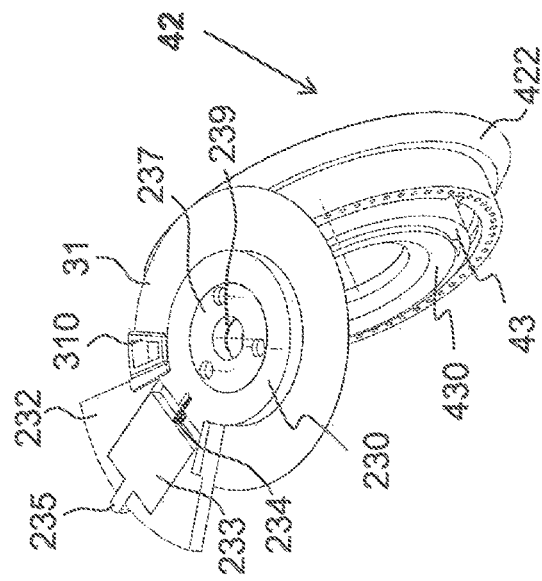
FIG. 10 shows a second perspective illustration of the grinder setting unit according to FIG. 9.
Figure 9:
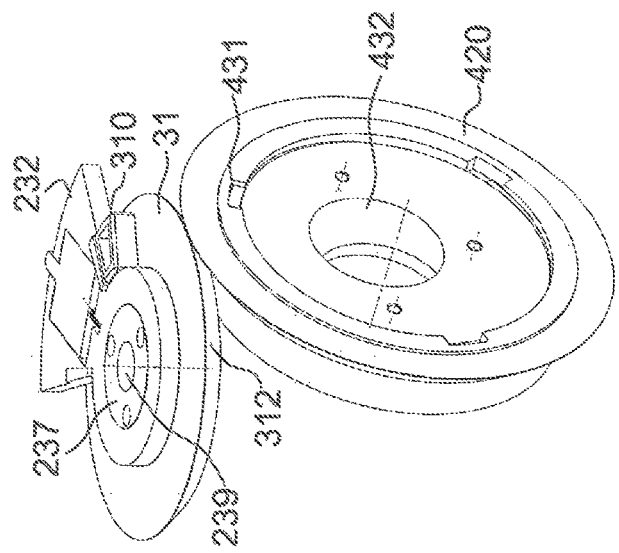
FIG. 9 shows a first perspective illustration of a grinder setting unit.
Figure 12:
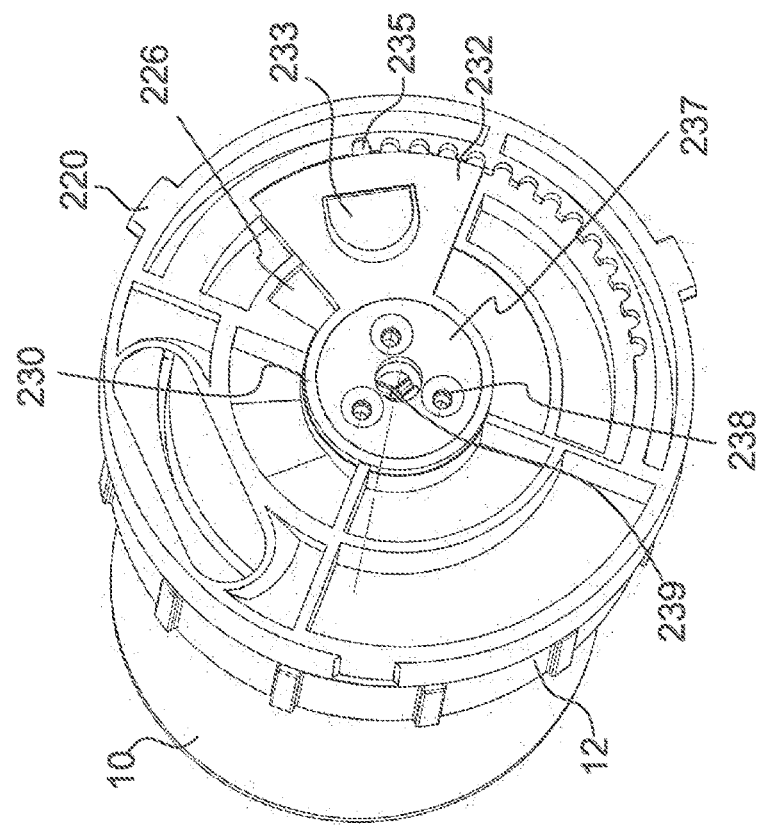
FIG. 12 shows a view from below of the container module according to FIG. 1, in a maximum grinder setting position.
Figure 11:
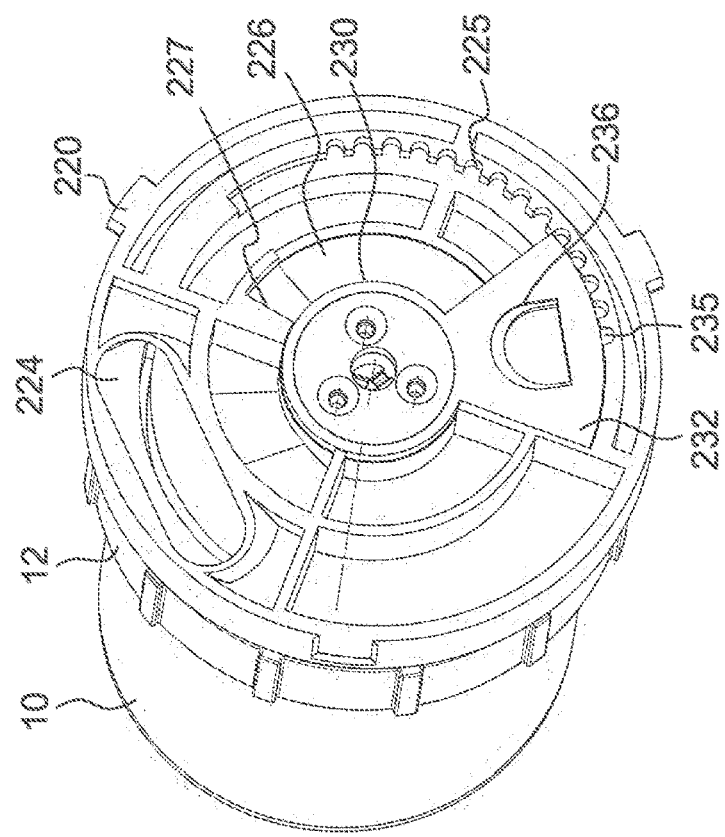
FIG. 11 shows a view from below of the container module according to FIG. 1, in a minimum grinder setting position.

FIGS. 11 and 12 show the container module 1, 2 from below. The chamber outlet 224 which is situated so as to be eccentric in the region of the external circumference can be readily seen. The base, with the exception of the already mentioned first drive axle passage opening 239, is otherwise configured so as to be closed. For reasons of production technology, said base here is provided with webs and ribs. Other design embodiments of the lower side of the base are possible. The arm 232 which in comparison to the illustration according to FIGS. 9 and 10 is now illustrated from the other side can likewise be readily seen. The displacement plate 233 which on this side is disposed in a recessed manner can likewise be seen through the window 236.

Said lower side has a detent latching pattern which comprises the above-mentioned displacement plate 233 and a gear rim segment 225. The tooth 235 of the displacement plate 233 can be brought to engage in said gear rim segment 225. To this end, the displacement plate 233 is pushed manually, counter to the spring force of the compression spring 234, rearward toward the longitudinal central axis of the apparatus such that the tooth 235 is released from the toothing. The displacement plate 233, conjointly with the rotating ring 230, is then pivoted about the longitudinal central axis, the displacement plate 233 is released by the user, and the tooth 235 is brought to engage with the gear rim segment 225 again in a desired position. The various rotary positions of the tooth 235 in the case of an assembled apparatus result in different positions of the grinding disks 430, 440 of the grinder 4, as is explained further below in the text. In order for the corresponding grinding disk settings to be identified, a corresponding marking is preferably attached along the gear rim segment 225. Said marking is not illustrated here.

An entrainment groove 226 for receiving the entrainer 310 of the setting disk 31 of the module receptacle 3 is situated at one end, here the upper end of the gear rim segment 225.

The activation of the displacement plate 233 and thus the setting along the gear rim segment 225 takes place in that a user places one of his/her fingers through the window 236 and onto the displacement plate 233, slightly depresses and displaces the latter rearward toward the longitudinal central axis. When the desired rotary position of the tooth 235 is reached, the user withdraws his/her finger and releases the displacement plate 233 again such that the tooth 235 can latch in the desired position.

The position in which the grinding disks 430, 440 upon fastening the container module are at a maximum mutual spacing and in which a coffee powder with coarse grains is thus obtained is illustrated in FIG. 11. The position in which the grinding disks 430, 440 upon fastening the container module are at a minimum mutual spacing and in which a coffee powder with fine grain is thus obtained is illustrated in FIG. 12. As can be seen by means of the multiplicity of teeth of the gear rim segment 225, a plurality of intermediate positions are possible and a very fine grading of the grinding degree can thus be achieved. The spacing between the grinding disks 430, 440 can preferably be varied in the range from 100 μm to 800 μm, preferably from approximately 250 μm to approximately 600 μm, and even more preferably from approximately 200 μm to approximately 600 μm.

It can now be seen in FIGS. 9 and 10 how the various rotary positions of the tooth 235 affect the grinder 4. When the container module 1, 2 is placed on the module receptacle 3, this preferably takes place by means of the bayonet closure 300 of the module receptacle 3 and the associated latching cams 220 of the portioning device 2. On account thereof, the grinding degree setting device 23 comes to bear on the setting disk 31. In order for the bayonet closure connection to be established, the container module 1, 2 is rotated within the module receptacle 3, preferably by 90°, as can be seen when comparing FIGS. 17a and 18a. On account of the rotation of the container module 1, 2 the rotating ring 230 with the arm 232 thereof is also conjointly rotated. As soon as the arm 232 impacts the entrainer 310, the setting disk 31 is likewise conjointly rotated specifically to the rotary position which is predefined by the settings of the arm 232.

The first bevel gear 312 of the setting disk 31 is thus likewise rotated and revolves along the second bevel gear 422 of the union nut 42. The union nut 42 is rotated on account of the revolving action, in particular on account of the beveled toothing.

The rotation of the union nut 42 results in the fixed disk flange 43, conjointly with the fixed grinding disk 430, being moved axially in the direction of the race grinding disk 440. The spacing between the fixed disk flange 43 and the race disk flange 44 decreases. This spacing here is referred to as the first spacing 80 and can be seen in FIGS. 16b, 17b, and 18b. On account thereof, a second spacing 81 between the fixed grinding disk 430 and the race grinding disk 440 likewise decreases.

Since the conveying rotor 441 is held so as to be axially displaceable in the counter bearing 40, the conveyor rotor 441 is not displaced.

The longer the path on which the entrainer 310 can be entrained by the arm 232, the longer the union nut 42 can rotate, and the farther the union nut 42 can move the fixed disk flange 43 axially toward the race disk flange 44. The smaller thus the spacing between the two grinding disks 430 and 440, and the finer the grinding degree set. In the setting according to FIG. 11 the path of the entrainer is relatively short, said path being relatively long in the setting according to FIG. 12.

The displacement of the bean inlet 41 conjointly with the fixed disk flange 43 in this embodiment is present by virtue of the very compact construction mode. A displacement of this type can be avoided in other embodiments. In the case of the bean inlet 41 being axially displaced, said bean inlet 41 is preferably configured of sufficient size so that said bean inlet 41 in all positions of displacement forms a receptacle opening of a size corresponding to the size of the bean outlet 224.

The grinding disks 430, 440 preferably moved to an initial setting when the container module is removed. The grinding disks 430, 440 in this initial setting are situated at a maximum mutual spacing. The initial setting of the grinding disks 430, 440 can be achieved by means of a restoring spring, for example, as soon as the container module 1, 2 is removed and the union nut 42 is thus released from the setting disk 31. The initial setting can also be achieved by way of a resetting motor or by other means. The grinding disks 430, 440 can be brought back to the desired mutual spacing when the container module is re-fastened.

The drive spindle and thus the grinder preferably still continue to be operated beyond a predefined duration once the grinding procedure has ended, so as to convey all coffee powder out of the grinder 4. This operation can take place at the same or at another rotating speed.

Figure 18A:
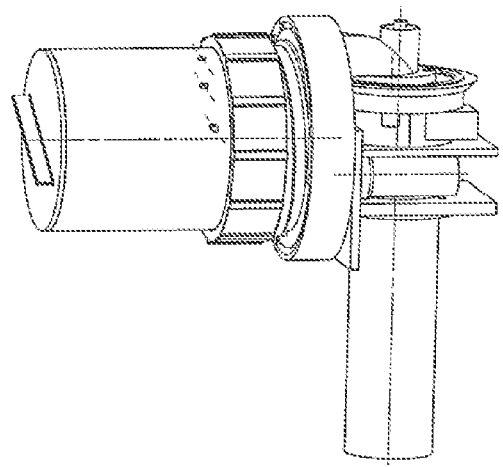
Figure 18B:
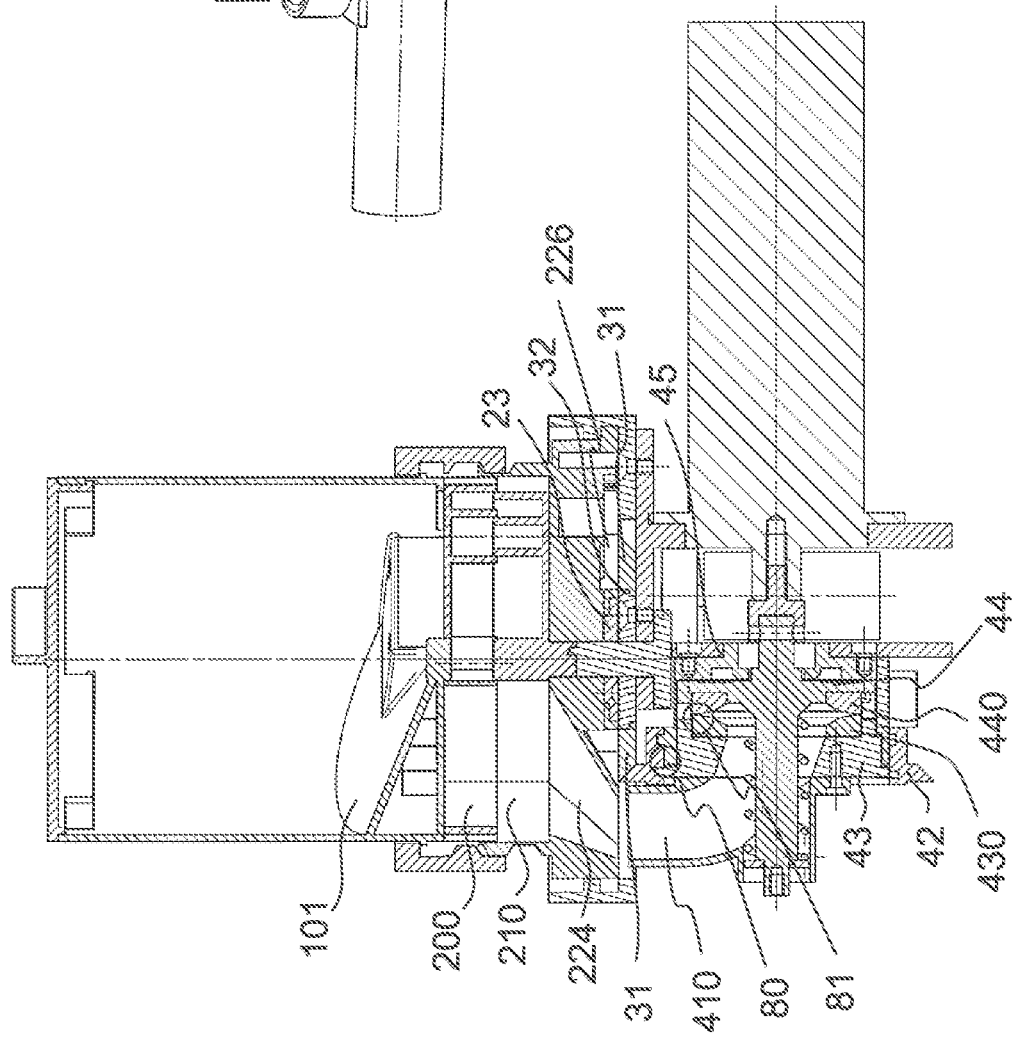
FIG. 18b shows a longitudinal section through the illustration according to FIG. 18a in the view from the rear.
Figure 20:
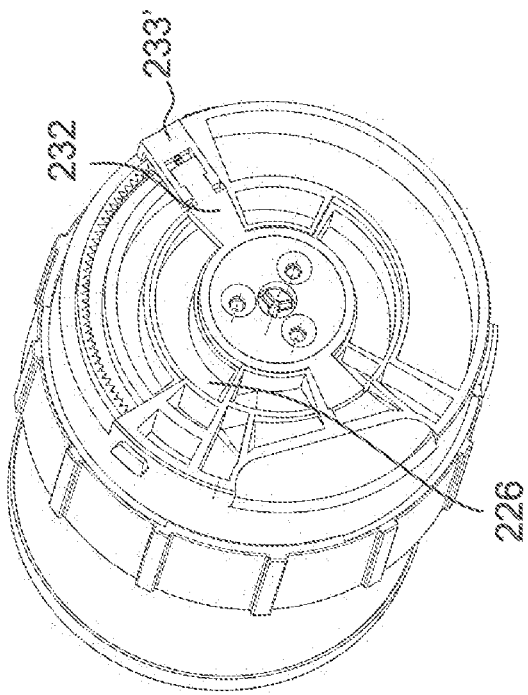
FIG. 20 shows a view from below of the container module according to FIG. 19, in a minimum grinder setting position.
Figure 19:
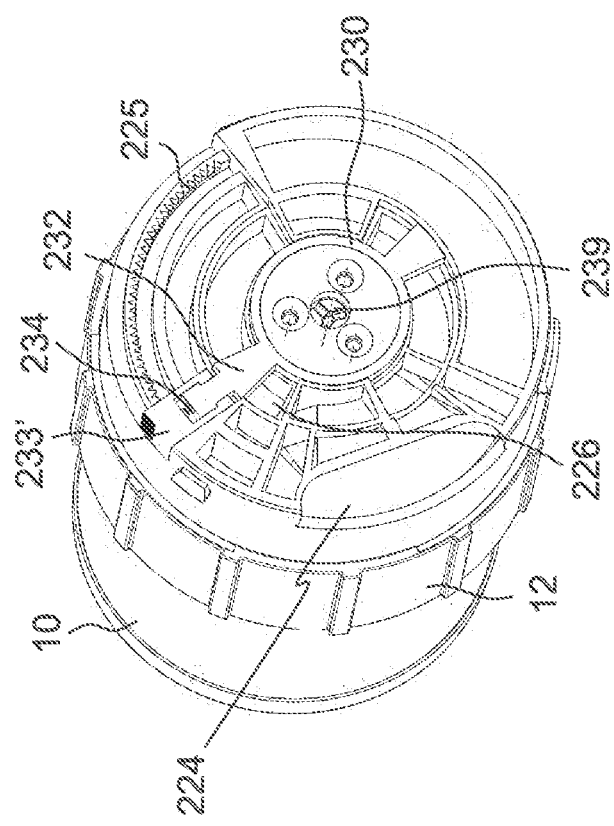
FIG. 19 shows a view from below of the container module according to a second embodiment according to the invention, in a maximum grinder setting position.
Figure 22:
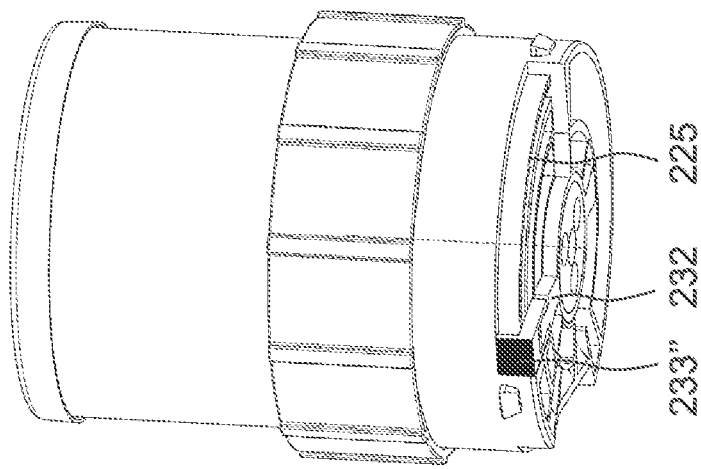
FIG. 22 shows a perspective illustration of the container module in the embodiment according to FIG. 19.

The comparison of FIGS. 16a to 18b shows the various positions of the individual components and the elements thereof prior to fitting the container module 1, 2 (FIGS. 16a, 16b), briefly after the placing thereof in a not yet rotated position (FIGS. 17a and 17b), as well as once rotation of the container module 1, 2 has taken place such that the grinding disks 430 and 440 are situated at the desired mutual spacing, and once activation of the drive axle 6 has taken place, such that also the chamber 200, 210 of the portioning device 2 is already situated above the bean inlet 41 of the grinder 4 (FIGS. 18a and 18b).

The container module 1, 2 can be easily removed again, closed and stored for the next use, for example in the fridge, once the brewing procedure has ended. The settings pertaining to the metering and to the grinding degree can be maintained without change, or be changed if required. A second or third container module which is of identical construction but is filled with another type of coffee beans and/or has another setting pertaining to the metering and/or another setting pertaining to the grinding degree can subsequently be connected to the module receptacle, and another type of coffee can be brewed immediately, without any further settings by the user, at the appropriate metering and the appropriate grinding degree and without compromising the aroma on account of the preceding coffee.

Figure 21:
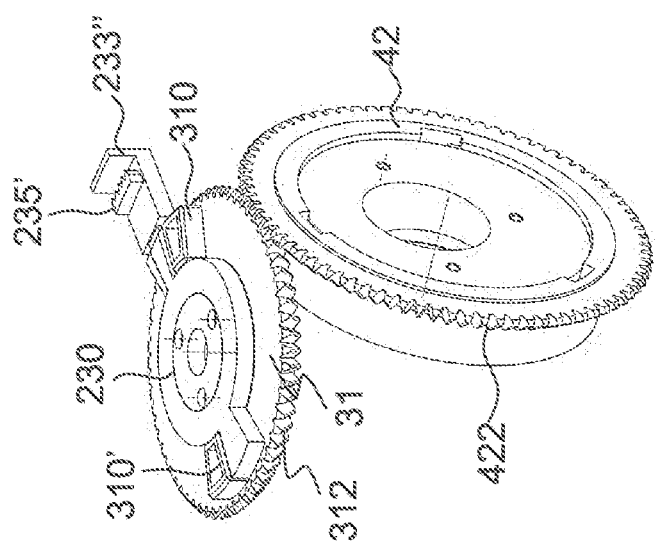
FIG. 21 shows a first perspective illustration of a grinder setting unit of the embodiment according to FIG. 19.

A second embodiment of the invention is illustrated in FIGS. 19 to 22. This embodiment is designed so as to be substantially identical to the first embodiment. However, the setting of the grinding degree is now performed laterally on the container module 1, 2. As can be seen in FIG. 21 a bevel gear drive is again present, having a first bevel gear 312 and a second bevel gear 422. The rotating ring 230 and the arm 232 radially projecting on the latter are also present. An angular element 233' is disposed so as to be sprung on the arm 232, wherein the angular element 233' has a leg 233" which is directed upward and bears on the external circumference of the container module 1, 2. This can be readily seen in FIGS. 19 and 22. A curved rack 235' which can be brought to engage with the gear rim segment 225 is disposed on the angular element 233'. Said rack 235' thus replaces the tooth 235 of the first example. The movement of the setting disk 31 is predetermined and the grinding degree is thus set on account thereof here too. The setting disk 31 in this example possesses two entrainers 310, 310' which are diametrically opposed. However, only one entrainer can also only be used here, or two entrainers can be present in the first example, respectively. As can be readily seen in FIG. 22, the grinding degree can now be set and the grinder setting be defined in that the leg 233" of the angular element 233' is pushed radially inward from the outside, and the arm 232 having the rotating ring 230 the angular element 23" is displaced by a specific angle. A marking or a scale is preferably disposed on the circumference of the container module 1, 2 so as to be adjacent to the leg 233".

A further preferred embodiment of the apparatus according to the invention is illustrated in FIGS. 24 to 33. The settings, and the transmission of the settings to the portioning device and the grinder, in this example again take place in a purely mechanical manner. However, it is also possible for only the portioning device or the grinder to be set mechanically, or for the one setting to be transmitted mechanically and the other setting, or transmission, to be performed electronically, or by means of data transfer. The apparatus is configured so as to be substantially identical to the description above such that the above disclosure also applies to this exemplary embodiment, unless differences which are explained hereunder or visible in the figures are present.

Figure 24:
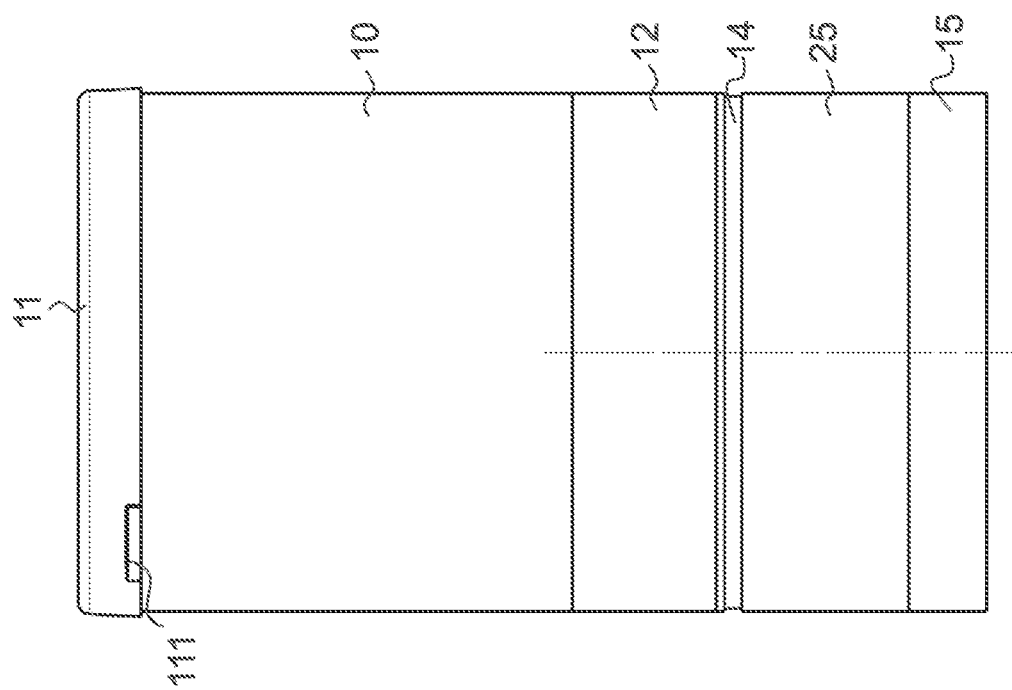
FIG. 24 shows a lateral view of a container module according to the invention, according to a third embodiment.
Figure 29:
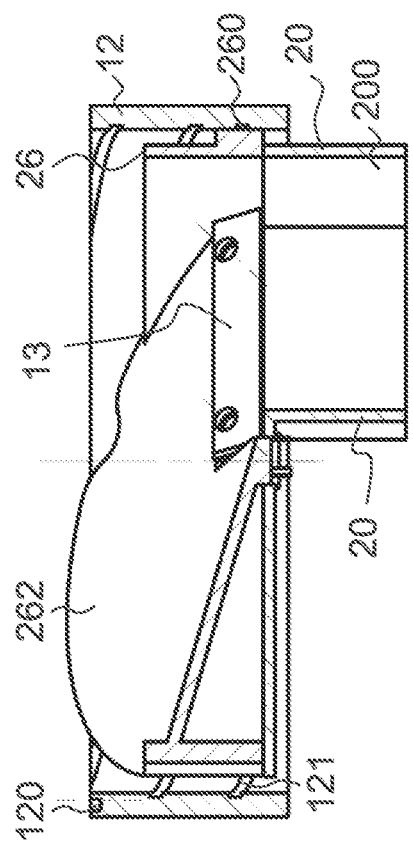
FIG. 29 shows a longitudinal section through the part according to FIG. 28.
Figure 28:
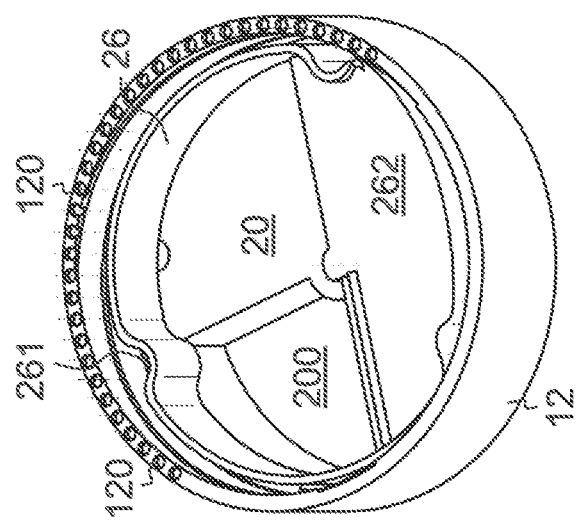
FIG. 28 shows a perspective illustration of part of the portioning device of the container module according to FIG. 24.
Figure 31:
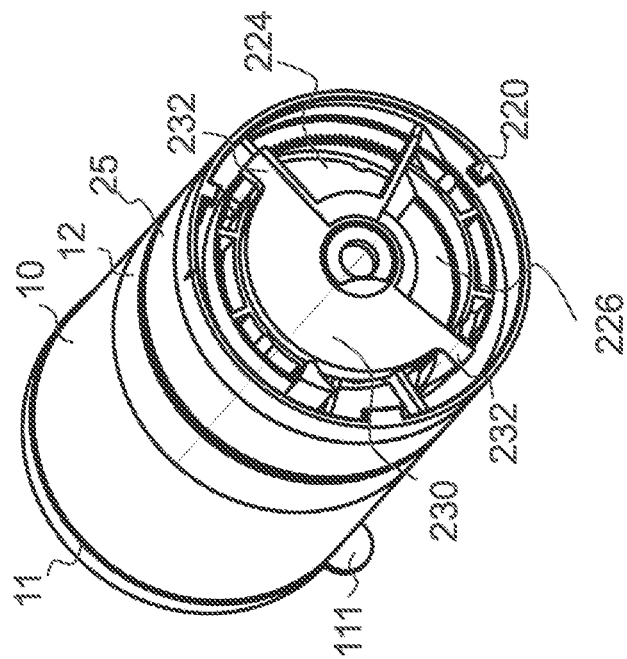
FIG. 31 shows a perspective illustration from below of the container module according to FIG. 24.

The container module according to FIG. 24 has a coffee bean container 1 having a can 10 for receiving coffee beans which have not yet been ground, as well as a lid 11 which closes the can 10 preferably in an airtight manner. The lid 11 in this example has a radially projecting pushbutton element 111. The portioning device 2 and the grinding degree setting device 23 are disposed in or on a central housing part 14, respectively, which is preferably fixedly connected to the can 10. Said housing part 14 is preferably screw-fitted to said can 10. The central housing part 14 preferably has a smaller external diameter than the can 10. Said central housing part 14 is surrounded by a lower setting ring 12 and an upper setting ring 25. A lower housing part 15 is fixedly connected to the central housing part 14 from below. Said lower housing part 15 is preferably screw-fitted to the central housing part 14. Depending on the embodiment, the connection is releasable and re-establishable, or not separable in a non-destructive manner.

The container module 1, 2 is configured so as to be substantially circular-cylindrical and has an external diameter which is preferably consistent across the entire height. Only the lid 11 has a different external diameter, depending on the embodiment.

The portion size to be ground can be selected by means of the upper setting ring 12, while the grinding degree can be selected by means of the lower setting ring 25. The upper setting ring 12 is preferably not variable in terms of the height thereof, while the lower setting ring 25 has to be preferably lifted or pulled down, depending on the embodiment, before said lower setting ring 25 can be rotated. At least one leaf spring 27 which is disposed between the lower setting ring 25 and the upper setting ring 12 ensures that the lower setting ring 25 when not in use is restored to the lower position thereof. The leaf spring 27 is preferably jammed between the lower setting ring 25 and a radially projecting periphery of the lower housing part 15. This can be seen in FIG. 26.

The container module 1, 2 can again be fastened on the module receptacle 3 of a coffee apparatus. This is illustrated in FIG. 25. The latching cams 220 in this example are directed radially inward, as can be readily seen in FIGS. 31 and 32. The grinder 4 and the grinder motor 5 are illustrated in FIG. 25 and will not be described once again in detail. However, the infeed duct 410 in this embodiment leads from the longitudinal central axis of the container module outward, and the grinder 4 is correspondingly disposed not adjacent to said longitudinal central axis L but so as to be peripheral to the container module 1, 2. The grinder motor 5 is correspondingly disposed on the opposite side. The mechanical coupling 31, 42 between the grinder setting device and the grinder 4 likewise takes place in a manner peripheral to the container module. This arrangement facilitates the adaptation to existing coffee apparatuses.

The portioning device 2 also in this example is connected to a drive, for example an electric motor, by way of the drive axle 6, as is illustrated in FIG. 25. The associated first drive axle receptacle 212 and third drive axle receptacle 222 are identified in FIGS. 26 and 27. The size of the metering chamber 200, 210 is selected by means of the upper setting ring 12 also in this example, should said size of the metering chamber 200, 210 not already been set to the desired size on account of the previous use of the container module. When the container module 1, 2 is placed onto the coffee apparatus and the coffee apparatus is activated, the drive 60 rotates the filled metering chamber 200, 210 to the chamber outlet 224 and releases the bean portion to be ground through the infeed duct 410 into the grinder 4.

The metering chamber 200, 210 is again formed by the upper rotating disk 20 and the lower rotating disk 21, said disks 20, 21 being mutually displaceable in the axial direction. An upper metering part 26 which is likewise displaceable in the axial direction relative to the lower rotating disk 21 is disposed above the upper rotating disk 20. The upper metering part 26 and the upper rotating disk 20 conjointly form an upper chamber part; the lower rotating disk 21 forms a lower chamber part. Depending on the configuration of the upper metering part 26, said upper metering part 26 is indeed axially displaceable conjointly with the lower rotating disk 20 but does not participate in terms of the volume of the upper metering chamber 200. Depending on the configuration of the metering part 26, the latter is not part of the upper chamber part but can be axially displaced so as to axially displace the upper rotating disk 21.

The lower region of the central housing part 14 preferably forms the base of the portioning device and thus the upward-directed planar face 228 which, depending on the rotary position of the metering chamber, closes said chamber toward the bottom. The chamber outlet 224 leads downward through the central housing part 14 and the lower housing part 15. In other embodiments, the base of the portioning device is formed by the lower housing part 15 or another component.

In order for the size of the metering chamber 200, 210 to be varied, the setting ring 12 can be rotated relative to the can 10. The upper metering part 26 preferably forms a lower limit of the can 10, that is to say a movable base 262 of the can 10. The diversion lip 13 is again preferably disposed on the movable base 262. The upper metering part 26 is preferably disposed in the central housing part 14.

The upper metering part 26 on the circumference thereof has outwardly projecting external thread portions 260 (FIG. 30) which engage in an internal thread 121 of the setting ring 12 (FIG. 26). These external thread portions 260 herein penetrate windows 140 of the central housing part 14. When the upper setting ring 12 is rotated along said windows 140, the upper metering part 26 is pushed downward or upward, respectively, while the upper rotating disk 20 is likewise displaced downward or upward, respectively, and the spacing from the lower rotating disk 21 as well as the size of the metering chamber 200, 210 is varied.

Clearances or concavities 261 are furthermore present on the circumference of the metering part 26. Said clearances or concavities 261 enable a void for screw heads (not illustrated here) for connecting the can 10 to the central housing part 14. The filled metering chamber 200, 210 when in operation can be emptied into the grinder 4 by rotating the upper chamber part 20 and the lower chamber part 21 by means of the drive 6. The upper metering part 26 herein is preferably not conjointly rotated.

In order for a metering once selected not to be able to be unintentionally adjusted when the container module is removed from the coffee apparatus, fixing of the setting ring 12 is preferably provided. In this embodiment, the setting ring 12 to this end has circular bores or depressions 120 on the upper end side of said setting ring 12, as can be readily seen in FIG. 28. The depressions 120 can be disposed so as to be distributed across the entire circumference, or be situated only in a portion of said circumference, as is illustrated here. At least one spring-mounted ball 16 which is lifted when the setting ring 12 is rotated and in the resting position is lowered in a sprung manner into one of the depressions 120 and thus fixes the setting ring 12 in the rotary position thereof is provided on the lower end side of the can 10. This can be seen in FIGS. 28 and 26, wherein the ball 16 is illustrated only by indicating the reference sign. A plurality of balls 16 of this type are preferably present.

This embodiment has the advantage that the can 10 or the portioning device 2 do not have to be conjointly rotated when the metered quantity is being set. Only the setting ring 12 is rotated for selecting the quantity of coffee beans to be ground. Moreover, the restoring springs and thus the spring holders 211 can be dispensed with. The assembly at the factory is thus simplified, and the production and material costs are minimized. It is furthermore advantageous that the upper setting ring 12 can be configured so as to be flush with the casing face of the can 10.

The setting of the grinding degree now likewise takes place by means of a rotating ring, specifically by means of the lower setting ring 25. The transmission of this setting to the grinder preferably takes place as to date, in a purely mechanical manner by way of the setting disk 31, to the second bevel gear 422 of the union nut 42 and thus to the grinder 4 (cf. FIG. 25). The setting disk 31 again has the entrainer 310, the arm 232 of the rotating ring 230 impacting the latter. The rotating ring 230 can be readily seen in FIGS. 31 to 34.

In this example, the setting disk 31 is disposed within the base plate 7 of the housing of the coffee machine. To this end, the base plate 7 has a passage opening 70 for the entrainer 310.

The grinding degree setting, as opposed to the exemplary embodiments described above, has a gearing which is disposed between the lower setting ring 25 and the rotating ring 230. The rotatable lower setting ring 25 has a lower internal gearing 250 which when rotating the lower setting ring 25 revolves along a gear having an external toothing 251. A further external toothing 252 having a smaller external diameter is fixedly connected to said external toothing in a concentric manner, but so as to be coaxially offset to the latter. Said further external toothing 252 revolves on an internal toothing 253 of the rotating ring 230, rotates the setting ring 230 in a manner corresponding to the rotation of the lower setting ring 25 and thus determines the position of the arm 232 of the rotating ring 230. The potential path of the entrainer 310 is determined on account thereof, and on account thereof the setting of the grinder 4. The internal toothing 253 is preferably disposed on a segment which projects axially from the base area of the rotating ring 230. The rotating ring 230 is also preferably configured as a segment.

Figure 30:
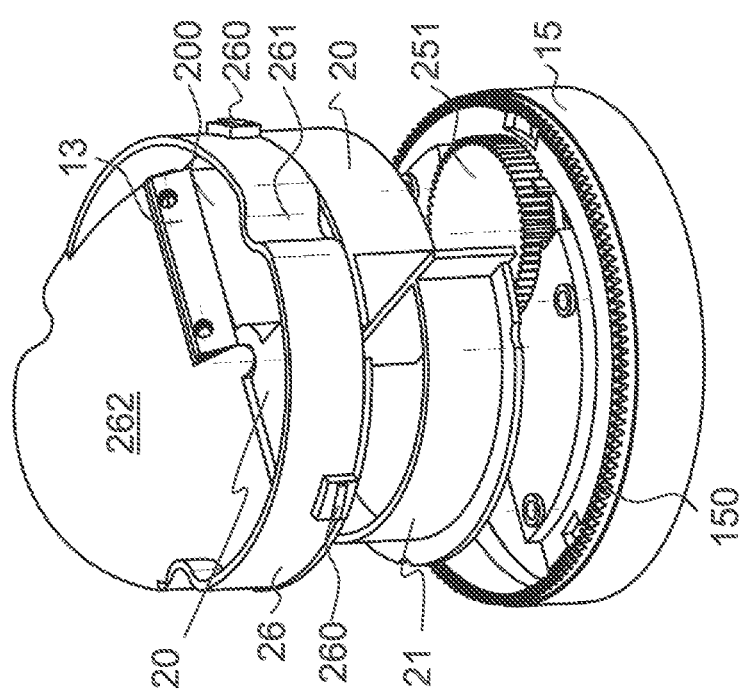
FIG. 30 shows a perspective illustration of part of the portioning device and of means for setting the grinding degree of the third exemplary embodiment.
Figure 33:
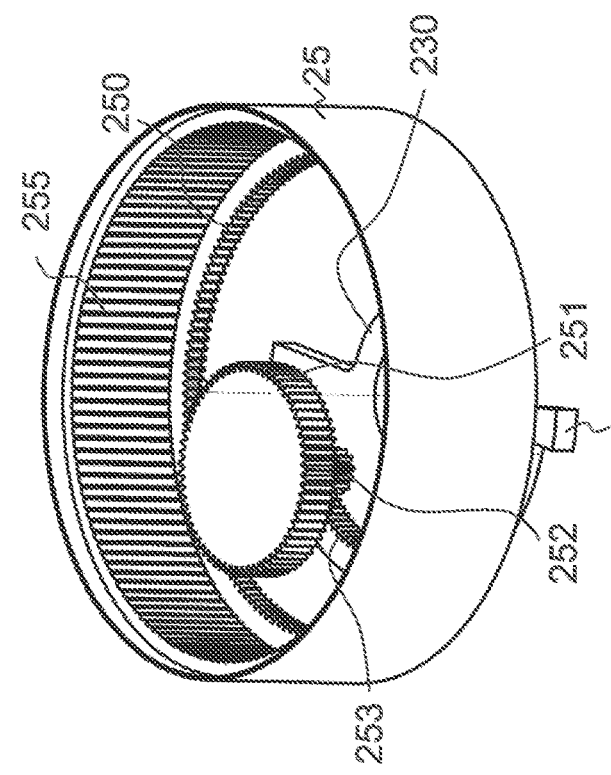
FIG. 33 shows a perspective illustration of part of the means for setting the grinding degree according to the third embodiment.
Figure 34:
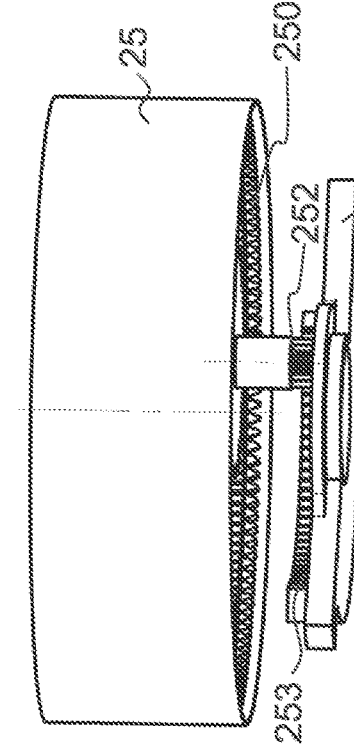
FIG. 34 shows a lateral view of the part according to FIG. 33.
Figure 32:
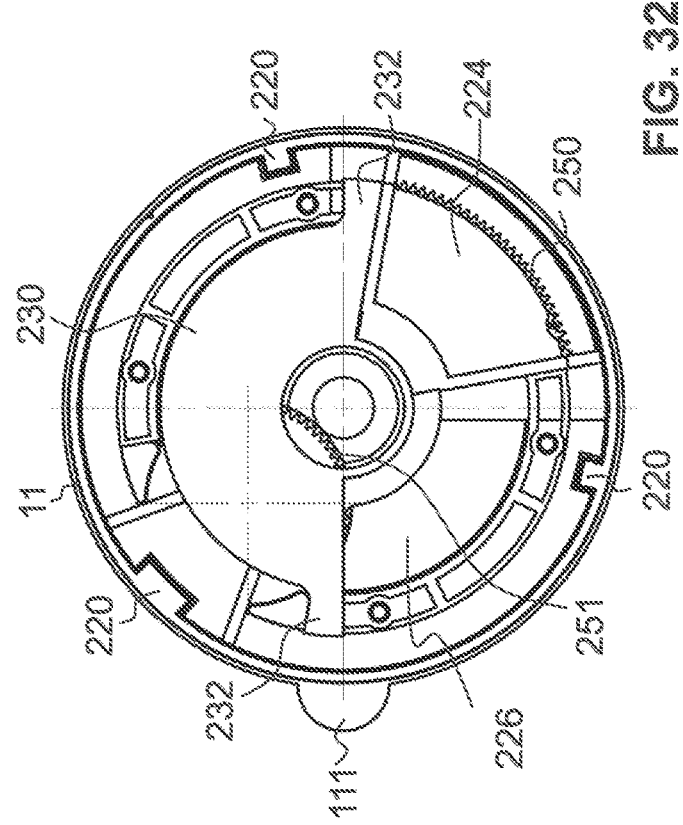
FIG. 32 shows a view from below of the container module according to FIG. 24.
Figure 45:
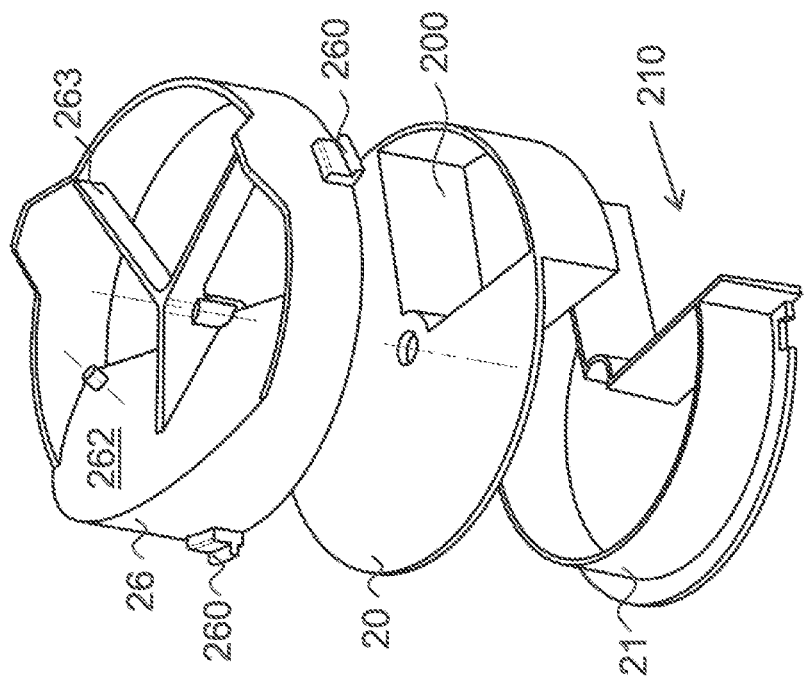
FIG. 45 shows an exploded illustration of part of the portioning device.
Figure 35:
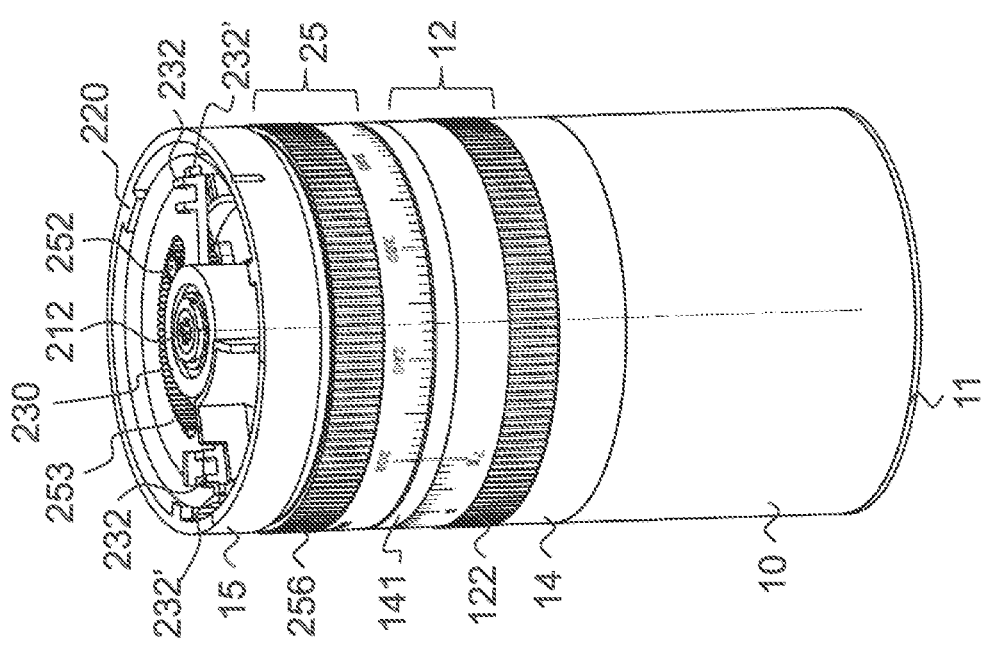
FIG. 35 shows a perspective illustration of a container module according to the invention, according to a fourth embodiment, in a reversed position.
Figure 37A:
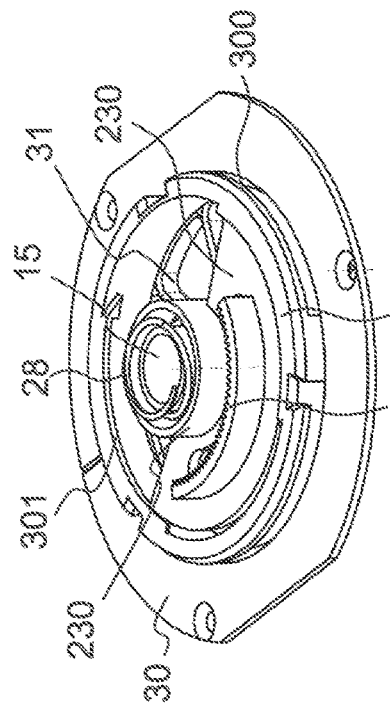
FIG. 37a shows a perspective illustration of the elements according to FIG. 36a conjointly with the module receptacle in contact with the entrainer.
Figure 38A:
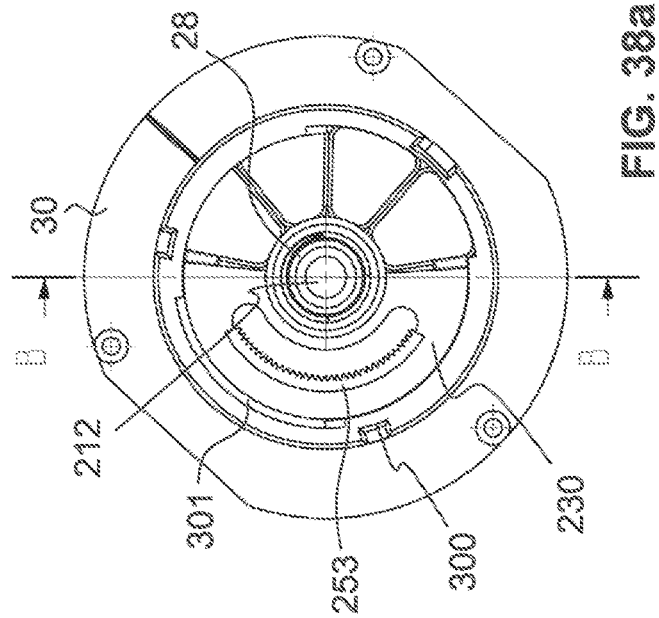
FIG. 38a shows a view from above of the elements having the module receptacle according to FIG. 37a in contact with the entrainer.
Figure 36A:
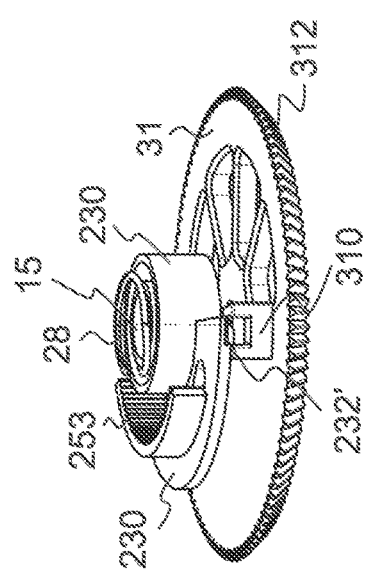
FIG. 36a shows in a perspective illustration a part of the elements for the grinding degree setting of the fourth embodiment according to FIG. 35 in contact with the entrainer.
Figure 39A:
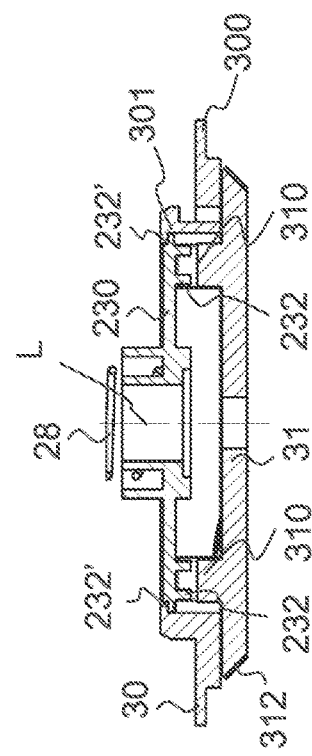
Figure 37B:
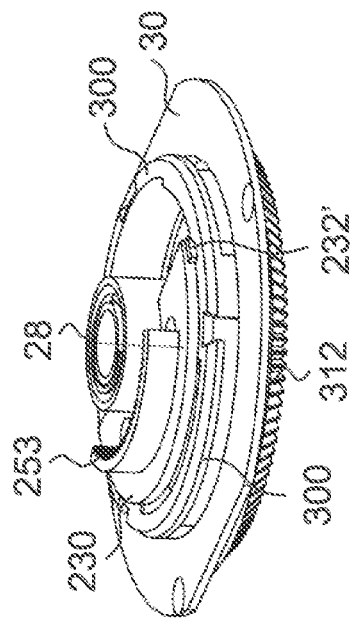
FIG. 37b shows a perspective illustration of the elements according to FIG. 36b conjointly with the module receptacle prior to contacting the entrainer.
Figure 39B:
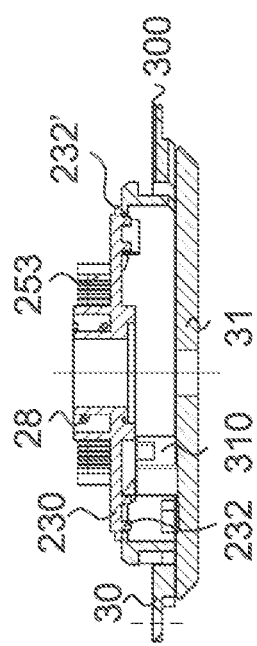
FIG. 39b shows a longitudinal section through A-A according to FIG. 38b.
Figure 38B:
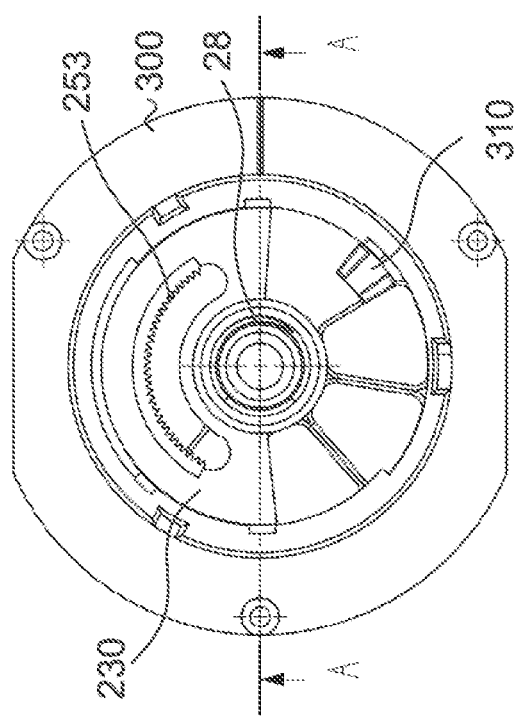
FIG. 38b shows a view from above of the elements having the module receptacle according to FIG. 37b prior to contacting the entrainer.
Figure 36B:
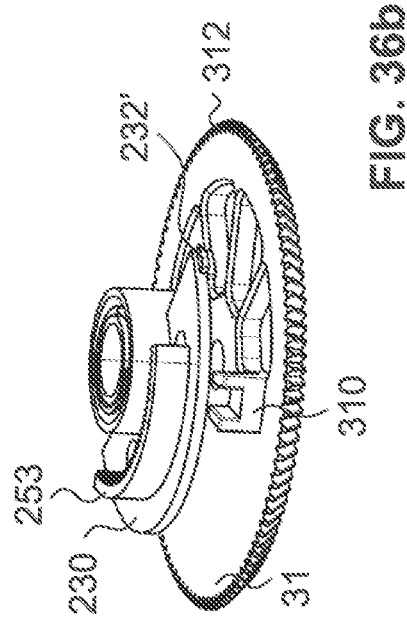
FIG. 36b shows in a perspective illustration the part of the elements according to FIG. 36a prior to contacting the entrainer.
Figure 39C:
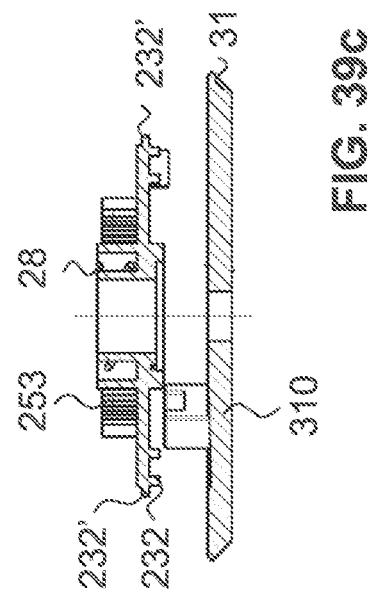
FIG. 39c shows a longitudinal section through A-A according to FIG. 38c.
Figure 38C:
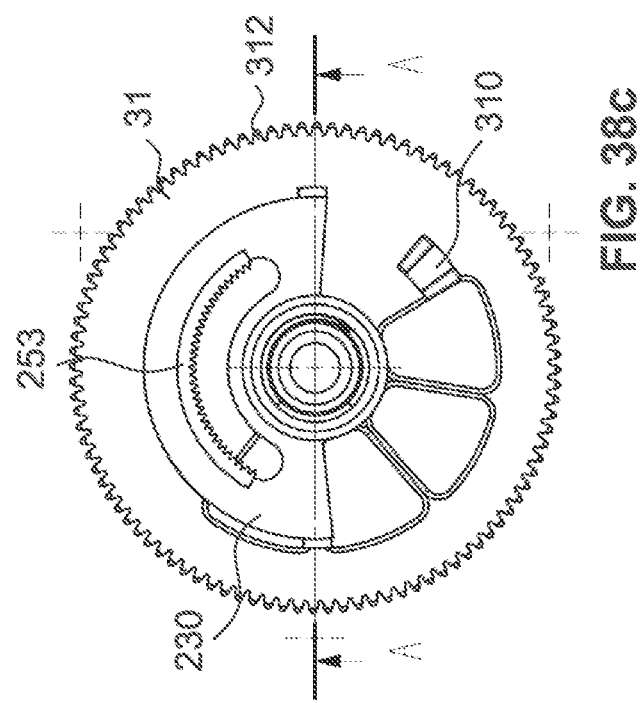
FIG. 38c shows a view from above of the elements according to FIG. 36b prior to contacting the entrainer.
Figure 40A:
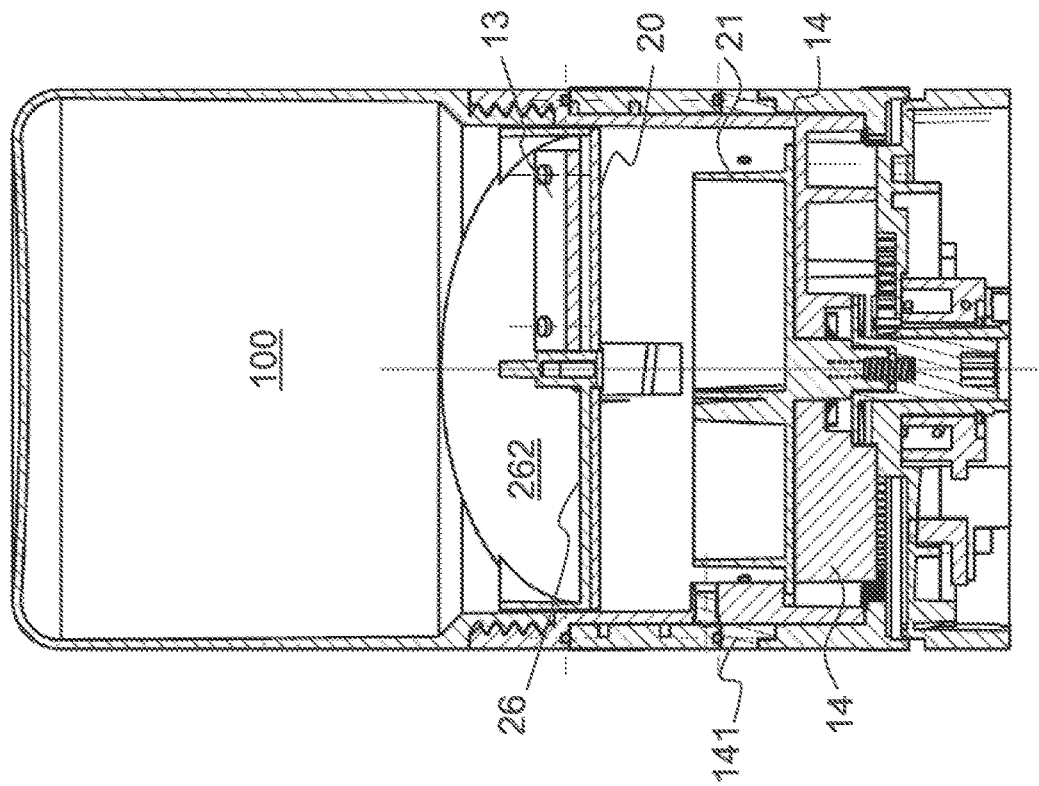
FIG. 40a shows a longitudinal section through the container module according to FIG. 35, having a single-use or multi-use bean container, at the minimum size of the metering chamber.
Figure 40B:
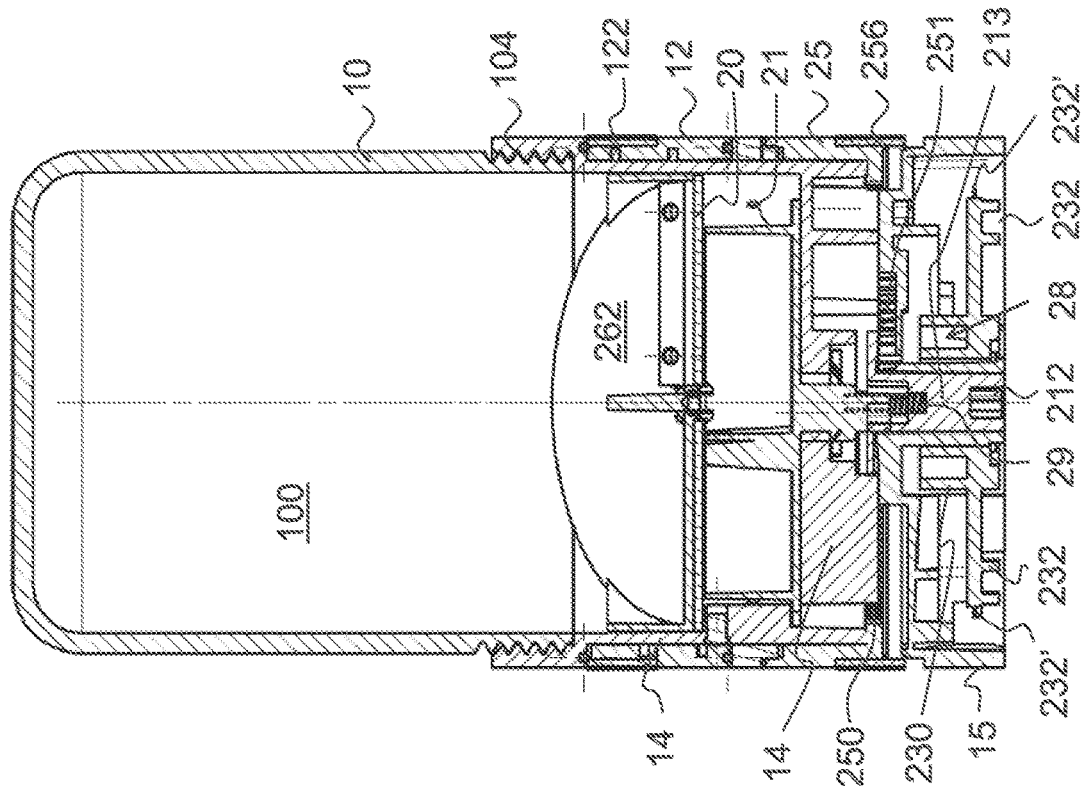
FIG. 40b shows a longitudinal section through the container module according to FIG. 35, having a single-use or multi-use bean container, at the maximum size of the metering chamber.
Figure 43A:
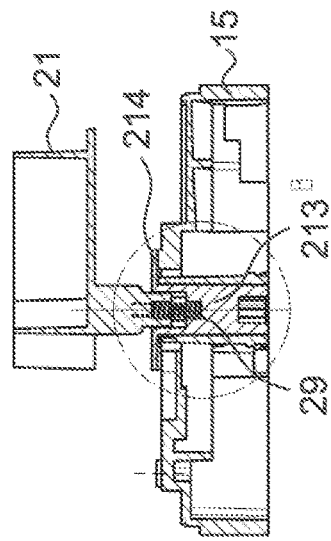
Figure 44A:
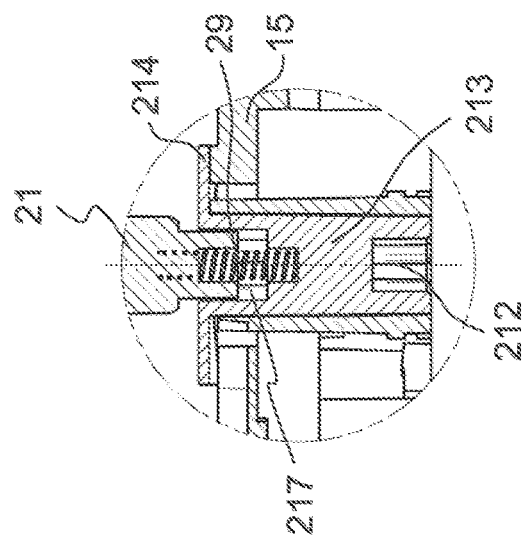
Figure 42A:
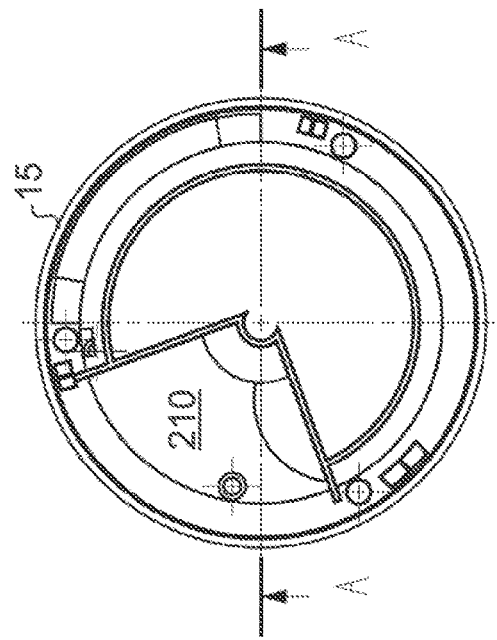
Figure 43B:
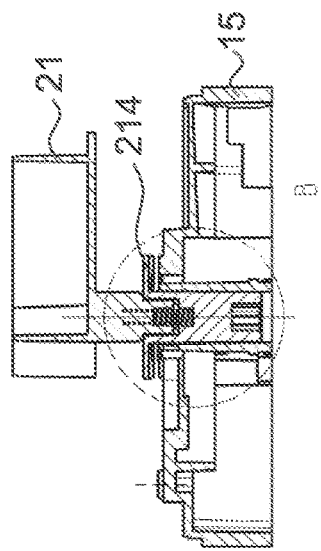
FIG. 43b shows a longitudinal section through A-A according to FIG. 42b.
Figure 44B:
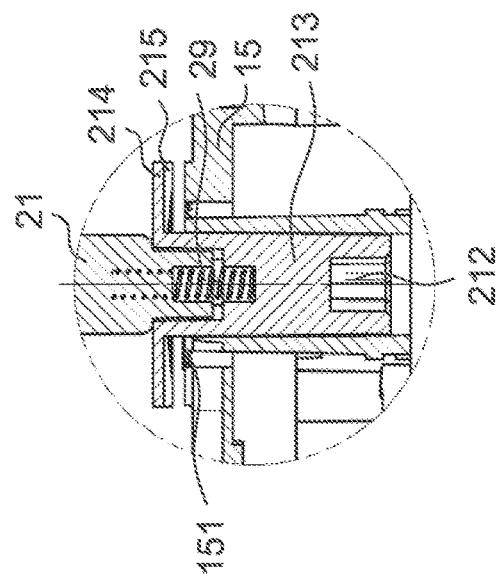
FIG. 44b shows an enlarged fragment according to FIG. 43b.

In order for a selected setting of the grinding degree not to be able to be involuntarily changed while removing the container module 1, 2 from the coffee apparatus and during the subsequent storing of the container module 1, 2, the lower housing part 15 on the upper end side thereof has a toothing 150 in which corresponding matching shapes on the lower end face of the lower setting ring 25 engage. This is illustrated in FIG. 30. The lower rotating ring 25 thus has to be lifted in order to be rotated. The at least one leaf spring 27 subsequently guarantees the restoring action.

The lower setting ring 25 on the internal circumference thereof preferably has a partial or encircling latching pattern 255 which provides the user with a haptic and/or acoustic signal when the setting ring 25 is rotated so that the user is certain of performing a setting of the grinding degree.

This embodiment enables an unpretentious and classic appearance and is visually appealing by virtue of the two setting rings 12, 25 which are flush with the surface. The use of the two setting rings 12, 25 which are readily accessible from the outside enables safe and simple handling of the container module 1, 2.

A further exemplary embodiment according to the invention is illustrated in FIGS. 35 to 45. The construction corresponds substantially to the variant according to the third exemplary embodiment. Two setting rings 12, 25 which can be rotated relative to the coffee bean container and the central housing part 14 and the lower housing part 15 so as to select the setting on the metering device, or on the portioning device 2, as well as the grinding degree are present here too. The setting rings 12, 25 now have a fluted periphery 122, 256 which is easy to grip, as well as markings. The locationally fixed reference marking is to be found on the intervening region 141 of the central housing part 14.

As opposed to the previous examples, the base of the coffee bean container 1 is configured so as to be open. Said base has an external thread 104 which engages in an internal thread of the central housing part 14. This can be readily seen in FIG. 40. The portioning device 2 is disposed in the central housing part 14, while the grinding degree setting device 23 is disposed on the lower housing part 15. The central housing part 14 and the lower housing part 15 are preferably fixedly connected to one another. In other embodiments, however, said central housing part 14 and said lower housing part 15 are connected to one another so as to be releasable in a non-destructive manner, in particular for the purpose of simple cleaning. The connection can be a plug connection, for example.

The coffee bean container 1 in this exemplary embodiment is configured so as to be circular-cylindrical. No lid is present. The end of the coffee bean container 1 which is directed upward when in use is configured so as to be closed, as can be seen in FIG. 40. The coffee bean container 1 when not in use can be separated from the central housing part 14 and be closed with an airtight lid. The coffee beans which are currently not in use can thus be stored in an optimal manner. The central housing part 14 and the lower housing part 15 can moreover be cleaned more easily in this way. Moreover, the coffee bean container 1 can thus be configured as a single-use part. The central housing part 14 and the lower housing part 15 which conjointly form a portioning device and grinding degree setting device module can be used multiple times. In other embodiments, the coffee bean container also has an opening at the upper end, said opening being able to be closed in an airtight manner by a lid.

The portioning device 2 is otherwise configured so as to be substantially identical to the exemplary embodiment according to FIGS. 24 to 30. The same parts are also provided with the same reference signs here. The upper metering part 26, the upper rotating disk 20, and the lower rotating disk 21 can be readily seen in FIG. 45. As opposed to the previous example, the upper metering part 26 has reinforcement ribs 263. Moreover, no concavities are present since the can 10 of the coffee bean container 1 is screw-fitted onto the central housing part 14. The functioning mode is the same as in the previous example. It is to be noted that the base of the chamber 200 is configured so as to be open, as in the previous examples, and the body of the lower rotating disk 21 that is open toward the top and extends almost across three quarters of a circle is preferably configured so as to be closed toward the bottom. The upper metering part 26, with the exception of the base 262, is likewise configured so as to be open toward the bottom, that is to say that the casing of the metering part 26 forms a ring in the remaining region. The upper metering part 26 closes off the metering chamber toward the top when the two rotating disks 20, 21 are rotated such that the metering chamber is opened toward the bottom. The portioning device is illustrated at the minimum size of the metering chamber in FIG. 40*a*, while the portioning device is illustrated at the maximum size of the metering chamber in FIG. 40*b*. The chamber per se cannot be readily seen in the two figures by virtue of the selected section.

Figure 41A:
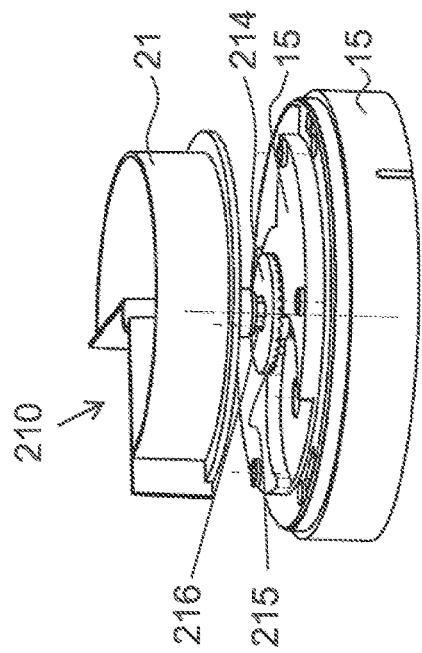
FIG. 41a shows a perspective illustration of the lower rotating disk 21 and of the lower housing part as well as of an active rotation safeguard.
Figure 41B:
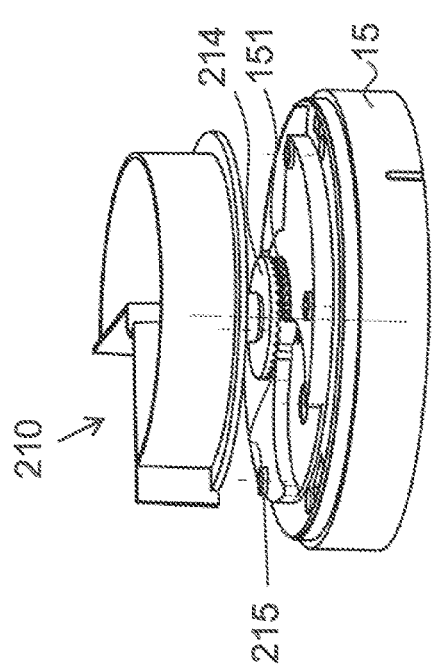
FIG. 41b shows a perspective illustration of the lower rotating disk 21 and of the lower housing part as well as of the rotation safeguard in a non-active position.
Figure 42B:
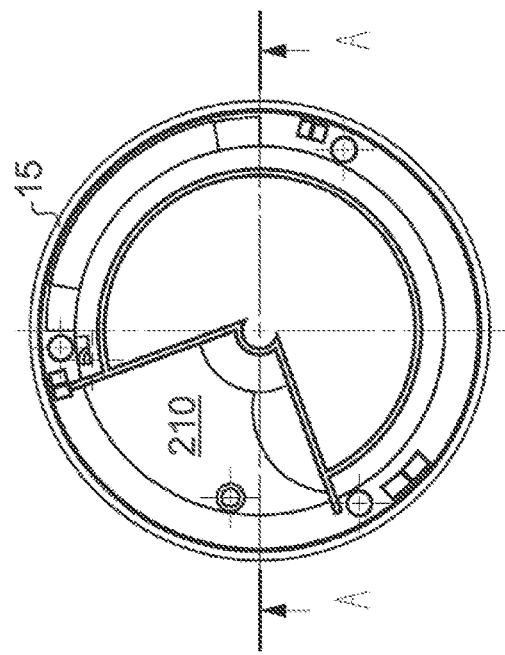
FIG. 42b shows a view from above of the elements according to FIG. 41b.

The portioning device 2 of this embodiment has a rotation safeguard. Said rotation safeguard prevents the metering chamber from opening toward the bottom unintentionally or prematurely, respectively, in particular when the container module is placed onto the coffee machine. A rotation safeguard piston 213 is disposed in the lower housing part 15. Said rotation safeguard piston 213 at the lower end thereof has the first drive axle receptacle 212. An encircling flange 214 which is directed radially outward is molded to the upper end of said rotation safeguard piston 213. This can be readily seen in FIGS. 43*a*, 43*b*, 44*a*, and 44*b*. A toothing is present on the lower side of the flange 214, as can be readily seen in FIGS. 41*a* and 41*b*. This toothing engages in an upward-directed toothing 151 of the lower housing part 15, as can be seen in FIG. 41*b*. A restoring spring 29 is disposed between the rotation safeguard piston 213 and the lower rotating disk 21.

The situation in which the rotating safeguard is active is illustrated in FIGS. 41*a* to 44*a*. This situation prevails when the container module has not yet been inserted on the coffee machine. The flange 214 bears on the lower housing part 15; the toothings 215 and 151 engaging one another. The restoring spring 29 is relaxed and holds the lower rotating disk 21 in an upper position. On account thereof, the lower rotating disk 21 is fixed in relation to the lower housing part 15. Said lower rotating disk 21 can thus not be rotated, and the metering chamber 200 can thus not be opened toward the bottom.

The situation in which the rotation safeguard is inactive is shown in FIGS. 41*b* to 44*b*. This is the case when the container module is inserted on the coffee machine. In this case, the drive axle 6 (cf. FIGS. 17*b* and 25) engages in the first drive axle receptacle 212 and lifts the rotation safeguard piston 213 counter to the spring force of the restoring spring 29. On account thereof, the flange 214 is lifted, and the toothings 215, 151 disengage from one another. The polygon 216 is engaged with the polygonal socket 217. The lower rotating disk 21 is connected in a rotationally fixed manner to the rotation safeguard piston 213 and thus to the drive axle 6. Said lower rotating disk 21 is moreover released from the lower housing part 15 and is rotatable relative to the latter. The lower chamber part 210 and thus the metering chamber can now be open toward the bottom.

A further point of differentiation in relation to the embodiments described above is to be found in the grinding degree setting device 23. The same gearing, or a similar gearing, as in the previous example is present. The rotating ring 230 here is also configured in the shape of the segment. The internal toothing 253 is again disposed so as to axially project in a segment.

The rotating ring 230 in this example is held so as to be spring-loaded between the setting disk 31 and the lower housing part 15. The corresponding spring is identified by the reference sign 28 in FIGS. 36, 37 and 39. The location where the spring is situated in the assembled state of the container module 1, 2 is identified by an arrow in FIG. 40*a*, without the spring 28 being plotted.

The rotating ring 230 in this example is configured as a segment. Said rotating ring 230 comprises at least 180°. Said rotating ring 230 again has two arms 232 which are diametrically opposed. Said two arms 232 in this example are directed downward, as can be readily seen in FIGS. 35, 39*a* to 39*c* and 40. Cams 232' which project in the radial direction project from the rotating ring 230 in the region of the arms 232. Said cams 232' can be readily seen in the figures already mentioned.

The container module 1, 2 for use is again connected to a module receptacle 3. The associated the receptacle body 30 is illustrated in 37*a*, 37*b*, as well as 39*a*, 39*b*. Said receptacle body 30 has a disk for fastening to or in a housing of a coffee machine, as well as a bayonet closure 300. The latching cams of the portioning device, more specifically of the lower housing part 15, engage in a corresponding bayonet thread on the external circumference of the bayonet closure 300. The bayonet closure 300 on the internal side thereof has a gate guide 301. The two cams 232' of the rotating ring 230 engage in this gate guide 301. The rotating ring 230 is thus clamped on both sides.

The setting disk 31 has two entrainers 310 which are directed upward and which are likewise diametrically opposite. Said entrainers 310 are preferably at the same spacing from the longitudinal central axis L as the arms 232 which are directed downward toward said entrainers 310 (cf. FIG. 39*a*).

When the container module 1, 2 now is twisted onto the bayonet closure 300 the rotating ring 230 is thus also clamped, wherein said rotating ring 230 along the internal gate guide 301 is pushed upward and the spring 28 is compressed. When the container module is twisted further along the bayonet closure into the module receptacle 3, the rotating ring 230 is either released from the gate guide 310 or is guided downward along said gate guide 310. The rotating ring 230 is lowered and the spring 28 is relaxed. On account thereof, at least one of the two arms 232 contact one or both entrainers 310, respectively, and on account thereof rotate the setting disk 31. The arms 232 herein either engage in the entrainers 310 or merely touch said entrainers 310.

The situation as prevails in the case of completely fastened or placed container module, respectively, is illustrated in FIGS. 36*a*, 37*a*, 38*a*, and 39*a*. The entrainers 310 have been contacted and the setting disk 31 has been moved to the desired rotary position.

The situation prior to the rotating ring 230 being twisted into the bayonet closure 300 is illustrated in FIGS. 36*b*, 37*b*, 37*c*, 38*b*, 38*c*, 39*b* and 39*c*.

This arrangement permits the grinder to be set in both directions. The grinding degree can thus still be varied even in the case of a container module 1, 2 that has already been mounted on the coffee machine. The rotating ring 230 is conjointly rotated in a rotation of the setting ring 25 in a desired direction. Independently of the rotating direction, at least one of the two arms 232 entrains in each case one or both of the entrainers 310, respectively, and thus rotates the setting disk 31. The union nut 42 rotates on account of the rotation of the setting disk 31, said union nut 42 engaging with said setting disk 31, and the grinding disks are thus displaced relative to one another. However, the coffee machine in this exemplary embodiment is preferably also automatically reset to the largest spacing of the grinding disks after use, when the container module is being removed.

The individual features of the exemplary embodiments described above can also be used in the other exemplary embodiments. For example, the screw-fittable coffee bean container can thus also be used in the first three exemplary embodiments. The same applies, for example, to the grinding degree setting of the fourth embodiment. The latter can also be used in the first three exemplary embodiments.

Individual aspects of the apparatuses described here are furthermore claimed as separate inventions which can also be used without the remaining elements, for example without the inventive concept of the container module. For example, various types of the mechanical setting of the grinder described here can also be used in other coffee apparatuses, but in particular not exclusively in combination with the manual grinding degree setting device. The different variants of the portioning device, having the two chamber parts which are variable in terms of their mutual spacing and which form a metering chamber of variable size and which are preferably configured so as to be at least partially rotatable and axially displaceable can also be in other portioning devices, for example without a grinding degree setting device and/or without coupling to a coffee apparatus. The individual elements of the grinder, in particular the disposal of the conveying worm in the preferably arcuate infeed duct, can also be used in other grinders, independently of the container module described.

Instead of a purely mechanical embodiment, information, for example pertaining to the grinding degree, can also be transmitted to the grinder by way of a data transfer, as has been mentioned above. A writable data memory can be present on the container module, a grinding degree matching the type of coffee preferably being already entered therein by the manufacturer. The coffee apparatus, for example the coffee mill or the coffee machine, preferably has a scanning and reading unit which communicates with the control system of the grinder or is part of said control system. The user of the device however has the possibility of varying the grinding degree, for example, in that said user enters a corresponding input pertaining to a desired current grinding degree into the coffee apparatus, for example into the control system by way of an input module. This new selection of the grinding degree is transferred to the data memory of the container module by way of the scanning and reading unit and is stored in said data memory so as to stand by as the basis for the next activation of the apparatus. In this embodiment, the grinding degree is thus no longer manually set at the container module but by way of a writable data memory on the container module, wherein a variation of the actual grinding degree is entered by the user at the apparatus and not at the container module. Instead of the grinding degree, other data can thus be stored and individually varied by the user, such as the running time of the grinder, the speed of the grinder, the water temperature when brewing, the size of the cup to be filled when dispensing the coffee, for example.

In another embodiment, the setting of the grinding degree takes place as before manually and preferably mechanically at the container module. The transmission of the information pertaining to the grinding degree setting however does not take place mechanically but by way of a sensor which is preferably disposed in or on the module receptacle 3 and which communicates with the control system of the grinder. The sensor reads the setting of the grinding degree selected by the user from the container module and transmits said setting to the control system of the grinder, whereupon the grinder is correspondingly set.

The unit according to the invention thus permits simple and user-friendly switching between types of coffee and/or metering settings and/or grinding degree settings without previously brewed coffee leading to the flavor of the subsequently brewed coffee being compromised.

The disclosure of this application also includes:
1. A unit of a coffee apparatus, in particular of a coffee machine for brewing a coffee beverage, wherein the unit has a coffee bean container (1) for storing the coffee beans, a portioning device (2) for metering the coffee beans for the coffee beverage, and a grinder (4) for grinding the metered coffee beans, characterized in that the coffee bean container (1) and the portioning device (2) are configured in a common container module, in that the unit has a module receptacle (3) to which the container module when in use is connectable and from which said container module after use is removable, and in that the container module has user-selectable settings of a metered quantity and of a grinding degree, wherein the setting of the metered quantity affects the portioning device (2) and the setting of the grinding degree affects the grinder (4).
2. The unit as claimed in item 1, wherein the setting of the metered quantity and/or the setting of the grinding degree are/is able to be carried out manually.
3. The unit as claimed in one of items 1 or 2, wherein the setting of the metered quantity and/or the setting of the grinding degree are/is able to be carried out prior to connecting the container module to the module receptacle.
4. The unit as claimed in one of items 1 to 3, wherein the setting of the metered quantity and/or the setting of the grinding degree are/is able to be carried out after connecting the container module to the module receptacle.
5. The unit as claimed in one of items 1 to 4, wherein the module receptacle (3) establishes a connection between the portioning device (2) and the grinder (4), and wherein the module receptacle (3) and the grinder (4) are disposed on or in a housing of the coffee apparatus.
6. The unit as claimed in one of items 1 to 5, wherein the container module has a writable data memory for communicating with a read/write unit of the module receptacle (3), wherein at least data pertaining to a current grinding degree setting of the grinder (4) is able to be stored in the data memory.
7. The unit as claimed in one of items 1 to 6, wherein the settings of the metered quantity and of the grinding degree are performed mechanically, and wherein the effect of the settings on the portioning device (2) and/or the grinder (4) takes place mechanically.
8. The unit as claimed in item 7, wherein the module receptacle (3) has a sensor for detecting the setting of the grinding degree on the container module, and wherein the sensor communicates with a control system of the apparatus.
9. The unit as claimed in one of items 1 to 8, wherein the portioning device (2) after connecting the container module to the module receptacle (3) is activatable by means of a drive (60) which is external to the container module, so as to provide a selected metered quantity in the portioning device (2) and to supply said metered quantity to the grinder (4).
10. The unit as claimed in one of items 1 to 9, wherein the portioning device (2) has a metering chamber (200, 210), and wherein the received volume of the metering chamber (200, 210) is variable for the purpose of setting the metered quantity.
11. The unit as claimed in items 10, wherein the portioning device (2) has a first rotating disk (20) and a second rotating disk (21), the mutual spacing of said disks (20, 21) being variable, and said first rotating disk (20) and said second rotating disk (21) being conjointly rotatable relative to the coffee bean container (1) and relative to a base (22) of the portioning device (2), wherein the metering chamber (200, 210) is configured between the first rotating disk (20) and the second rotating disk (21), and wherein the metering chamber (200, 210), depending on the rotary position of the first rotating disk (20) and the second rotating disk (21), is open in relation to either of the two components of coffee bean container (1) and grinder (4) and closed in relation to the other of said two components.

12. The unit as claimed in item 10, wherein the portioning device (2) has a first chamber part (26, 20) and a second chamber part (21), said chamber parts (26, 20, 21) being mutually displaceable in the axial direction, wherein the metering chamber (200, 210) is configured between the first chamber part (26, 20) and the second chamber part (21), and wherein the metering chamber (200, 210), depending on a rotary position of at least one of the two chamber parts (26, 20, 21), is open in relation to either of the two components of coffee bean container (1) and grinder (4) and closed in relation to the other of said two components.

13. The unit as claimed in one of items 1 to 12, wherein a setting ring (12) which for setting the metered quantity is disposed so as to be rotatable on a circumference of the coffee bean container (1) is present.

14. The unit as claimed in item 13, wherein the setting ring (12) is rotatable relative to the coffee bean container (1).

15. The unit as claimed in one of item 1 to 14, wherein the grinder (4) has two grinding disks (430, 440), wherein at least one of the two grinding disks (430, 440) as a function of the setting of the grinding degree is displaceable when or after connecting the container module to the module receptacle (3).

16. The unit as claimed in item 15, wherein the container module has a grinding degree setting device (23) which when connecting the container module to the module receptacle (3) is able to be mechanically and operatively connected to the grinder (4), on account of which the spacing of grinding disks (430, 440) of the grinder (4) is varied.

17. The unit as claimed in one of item 15 or 16, wherein the setting of the grinding degree on the container module is able to be operatively connected to a rotatable setting disk (31) of the module receptacle (3), wherein the setting disk (31) is operatively connected to a rotatable union nut (42) of the grinder (4), and wherein a first grinding disk (430) by virtue of the rotation of the union nut (42) is displaceable relative to a second grinding disk (440) such that the spacing of said disks (430, 440) is varied.

18. The unit as claimed in item 17, wherein the first grinding disk is a non-rotating fixed grinding disk (430), and the second grinding disk is a rotating race grinding disk (440).

19. The unit as claimed in one of items 1 to 18, wherein the container module has a setting means (23, 25) for setting the grinding degree, wherein said setting means (23, 25) is disposed on a lower side or on the circumference of the container module.

20. The unit as claimed in item 19, wherein the setting means is a setting ring (25) which is disposed so as to be rotatable on a circumference of the coffee bean container (1).

21. The unit as claimed in item 20, wherein the setting ring (25) for setting the grinding degree is rotatable relative to the coffee bean container (1).

22. The unit as claimed in one of items 15 to 21, wherein the setting of the grinding degree is manually variable in the case of a mounted container module.

23. The unit as claimed in one of items 15 to 22, wherein the setting of the grinding degree in the case of a mounted container module is variable in the direction of a finer grinding degree as well as in the direction of a coarser grinding degree.

24. The unit as claimed in one of items 1 to 23, wherein a rotation safeguard which prevents the portioning device (2) from being prematurely emptied is present.

25. The unit as claimed in one of items 1 to 24, wherein the coffee bean container (1) is releasably connected to the portioning device (2), and wherein the portioning device conjointly with a grinding degree setting device (23) for setting the grinding degree forms a sub-module which is configured for connecting to the module receptacle (3).

26. The unit as claimed in one of items 1 to 25, wherein the grinder (4) has a conveying rotor (441) which drives the grinding disks (430, 440), wherein the conveying rotor (441) is disposed so as to run almost or exactly horizontally.

27. The unit as claimed in one of items 1 to 26, wherein the grinder (4) has a bean inlet duct (410), which is configured so as to be arcuate.

28. The unit as claimed in items 25 and 26, wherein the conveying rotor (441) extends into the bean inlet duct (410).

29. A container module, in particular of a unit as claimed in one of items 1 to 28, wherein the container module has a coffee bean container (1) for storing the coffee beans and a portioning device (2) for metering the coffee beans for the single portion, wherein the container module has connecting means for releasably connecting to the module receptacle (3) of the coffee apparatus, and wherein the container module has user-selectable settings of a metered quantity and of a grinding degree, wherein the setting of the metered quantity affects the portioning device (2), and the setting of the grinding degree affects the grinder.

30. The container module as claimed in item 29, wherein the container module has a grinding degree setting device (23) for setting the grinding degree, wherein the grinding degree setting device (23), which when connecting the container module to the module receptacle (3) is able to be mechanically and operatively connected to the grinder (4), on account of which the spacing of grinding disks (430, 440) of the grinder (4) is varied.

31. A unit of a coffee apparatus, in particular of a coffee machine for brewing a coffee beverage, wherein the unit has a coffee bean container (1) for storing the coffee beans, a portioning device (2) for metering the coffee beans for the coffee beverage, and a grinding degree setting device (23) for mechanically and operatively connecting to a grinder (4) for grinding the metered coffee beans, characterized in that the coffee bean container (1) and the portioning device (2) are configured in a common container module, in that the unit has a module receptacle (3) to which the container module when in use is connectable and from which said container module after use is removable, and in that the container module has user-selectable settings of a metered quantity and of a grinding degree, wherein the setting of the metered quantity affects the portioning device (2) and the setting of the grinding degree by means of the grinding degree setting device (23) affects the grinder (4).

The invention claimed is:

1. An apparatus for dosing coffee beans for the purpose of selecting a metered quantity to be ground, the apparatus comprising a portioning device with a metering chamber having a receiving volume for receiving the coffee beans, wherein the receiving volume is variable,
   wherein the apparatus comprises a coffee bean container for storing the coffee beans, the coffee bean container and the portioning device being configured in a common container module,
   wherein the container module is configured for removable connecting to a module receptacle of a coffee device, wherein the module receptacle leads to a grinder,
   wherein the container module comprises a setting ring for manual adjustment of the metered quantity,
   wherein a selection of the metering quantity takes place manually by rotating the setting ring, a size of the metering chamber being varied on account rotating the setting ring,
   wherein the coffee bean container does not conjointly rotate with said setting ring,
   wherein the selection is maintained when the container module is removed from the module receptacle, and
   wherein the selection does not have to be performed again for each additional new use of the apparatus even when another container module having another selection of the metering quantity was connected to the module receptacle of the coffee device and used and removed again in between.

2. The apparatus as claimed in claim 1, wherein the selection of the metered quantity is performed mechanically and wherein the effect of the settings on the portioning device takes place mechanically.

3. The apparatus as claimed in claim 1, wherein the setting ring is disposed so as to be rotatable on a circumference of the apparatus.

4. The apparatus as claimed in claim 3, wherein the setting ring is rotatably arranged at the circumference of the device.

5. The apparatus as claimed in claim 1, wherein the portioning device has a first chamber part and a second chamber part, wherein the metering chamber is configured between the first chamber part and the second chamber part, the distance between the first chamber part and the second chamber part being changeable, whereby the receiving volume of the metering chamber being changeable.

6. The apparatus as claimed in claim 5, wherein the first chamber part and the second chamber part are displaceable in the axial direction relative to each other.

7. The apparatus as claimed in claim 5, wherein the metering chamber depending on a rotary position of at least one of the two chamber parts, is open toward the top and closed toward the bottom or closed toward the top and open toward the bottom.

8. The apparatus as claimed in claim 5, wherein the portioning device has a first rotating disk with the first chamber part and a second rotating disk with the second chamber part, the spacing of said disks relative to each other being variable, wherein the first rotating disk and the second rotating disk being conjointly rotatable relative to a base of the portioning device.

9. The apparatus as claimed in claim 8, wherein the first rotating disk forms an upper rotating disk and the second rotating disk forms a lower rotating disk, and wherein an upper metering part is arranged above, wherein the upper metering part closes the metering chamber toward the top, when the upper rotating disk and the lower rotating disk are rotated such that the metering chamber is open toward the bottom.

10. The apparatus as claimed in claim 8, wherein the first rotating disk is circular and comprises, with exception of a first sector which is configured as a passage opening, a closed planar cover, wherein the first sector forms the upper chamber part, and wherein the second rotating disk is circular and comprises, with exception of a second sector which is configured as a passage opening, a closed planar cover, wherein the second sector forms the lower chamber part, wherein the first rotating disk can be pushed over the second rotating disk and wherein the space between the first rotating disk and the second rotating disk is variable in a guided manner.

11. The apparatus as claimed in claim 9, wherein the coffee bean container is detachably connected to the portioning device.

12. The apparatus as claimed in claim 1, wherein a rotation safeguard which prevents the portioning device from being prematurely emptied is present.

13. The apparatus as claimed in claim 1, wherein the selection of the metering quantity can be performed before and/or after connecting the apparatus to the module receptacle.

14. The apparatus as claimed in claim 1, wherein the portioning device after connecting the container module to the module receptacle is activatable by means of a drive which is external to the container module, so as to provide a selected metered quantity in the portioning device and to supply said metered quantity to the grinder.

15. An apparatus for dosing coffee beans for the purpose of selecting a metered quantity to be ground, the apparatus comprising a portioning device with a metering chamber having a receiving volume for receiving the coffee beans,
   wherein the receiving volume is variable, wherein the portioning device has a first chamber part and a second chamber part,
   wherein the metering chamber is configured between the first chamber part and the second chamber part, the distance between the first chamber part and the second chamber part being changeable, whereby the receiving volume of the metering chamber being changeable,
   wherein the portioning device has a first rotating disk with the first chamber part and a second rotating disk with the second chamber part, the spacing of said disks relative to each other being variable,
   wherein the first rotating disk and the second rotating disk being conjointly rotatable relative to a base of the portioning device.

16. The apparatus as claimed in claim 15, wherein the first rotating disk forms an upper rotating disk and the second rotating disk forms a lower rotating disk, and wherein an upper metering part is arranged above, wherein the upper metering part closes the metering chamber toward the top, when the upper rotating disk and the lower rotating disk are rotated such that the metering chamber is open toward the bottom.

17. The apparatus as claimed in claim 15, wherein the first rotating disk is circular and comprises, with exception of a first sector which is configured as a passage opening, a closed planar cover, wherein the first sector forms the upper chamber part, and wherein the second rotating disk is circular and comprises, with exception of a second sector which is configured as a passage opening, a closed planar cover, wherein the second sector forms the lower chamber part, wherein the first rotating disk can be pushed over the second rotating disk and wherein the space between the first rotating disk and the second rotating disk is variable in a guided manner.

* * * * *

UNITED STATES PATENT AND TRADEMARK OFFICE
CERTIFICATE OF CORRECTION

| | | |
|---|---|---|
| PATENT NO. | : 12,114,808 B2 | Page 1 of 1 |
| APPLICATION NO. | : 18/062824 | |
| DATED | : October 15, 2024 | |
| INVENTOR(S) | : Louis Deuber et al. | |

It is certified that error appears in the above-identified patent and that said Letters Patent is hereby corrected as shown below:

In the Claims

Column 30, Line 19, Claim 11, delete "claim 9," and insert -- claim 1, --

Signed and Sealed this
Third Day of December, 2024

*Katherine Kelly Vidal*

Katherine Kelly Vidal
*Director of the United States Patent and Trademark Office*